(12) United States Patent
Kansa et al.

(10) Patent No.: US 6,478,839 B1
(45) Date of Patent: Nov. 12, 2002

(54) METHOD OF INDUCTION-HEAT MELTING TREATMENT OF METAL-OXIDE-CONTAINING POWDERS AND DEVICE THEREFOR

(76) Inventors: Ken Kansa, 2-18-8 Showa, Kawasaki-ku, Kawasaki-shi, Kanagawa 210-0813 (JP); Yoshihide Mukouyama, 1-2-15-208 Takadanobaba, Shinjuku-ku, Tokyo 169-0075 (JP)

( * ) Notice: Subject to any disclaimer, the term of this patent is extended or adjusted under 35 U.S.C. 154(b) by 0 days.

(21) Appl. No.: 09/700,688
(22) PCT Filed: May 1, 2000
(86) PCT No.: PCT/JP00/02866
§ 371 (c)(1),
(2), (4) Date: Mar. 29, 2001
(87) PCT Pub. No.: WO00/68440
PCT Pub. Date: Nov. 16, 2000

(30) Foreign Application Priority Data

May 6, 1999 (JP) .............................. 11-125750

(51) Int. Cl.[7] .............................. C22B 4/08; C22B 5/00
(52) U.S. Cl. ..................................... 75/10.14; 373/141
(58) Field of Search ......................... 75/10.14; 373/141

(56) References Cited

U.S. PATENT DOCUMENTS

| | | | | | |
|---|---|---|---|---|---|
| 2,206,973 A | * | 7/1940 | Payne | ........................ | 266/138 |
| 2,297,747 A | * | 10/1942 | Clark | ........................ | 373/148 |
| 2,876,094 A | * | 3/1959 | Lusby, Jr. | .................... | 277/532 |
| 4,494,984 A | * | 1/1985 | Calderon | ................... | 75/10.15 |
| 5,479,436 A | * | 12/1995 | Hashida et al. | ............. | 373/139 |

FOREIGN PATENT DOCUMENTS

JP          4-232216          8/1992          ............. C22B/7/00

OTHER PUBLICATIONS

International Search Report Jul. 18, 2000 for PCT/JP00/02866.

* cited by examiner

Primary Examiner—Roy King
Assistant Examiner—Tima McGurthry-Banks
(74) Attorney, Agent, or Firm—Sughrue Mion, PLLC

(57) ABSTRACT

A device for induction-heat melting treatment of metal-oxide-powders includes a closed hopper, a heat-resistant piping, for supplying a powder to an induction heating pipe which is made of dielectric material and comes in contact with the lower end part of the heat-resistant pipe in a vertically sliding manner, a raising/lowering drive mechanism for the induction heating pipe, a receiving container, which receives the melt of the powder that has been melted in the induction heating pipe, a cylindrical upper vacuum chamber, which encloses the abovementioned components, an induction heating coil, which externally surrounds the lower part of the cylindrical upper vacuum chamber, an electric precipitation mechanism, disposed at the upper part of the interior of the cylindrical upper vacuum chamber, a tilting pan, which relays the melt that overflows and flows down from receiving container, a tilting mechanism for the tilting pan, a melt storage tank, which receives and stores the melt that flows down from the tilting pan, and a lower vacuum chamber, which encloses the tilting pan and the melt storage tank and is in communication with the lower end of the cylindrical upper vacuum chamber.

18 Claims, 13 Drawing Sheets

(a)

(b)

METHOD OF INDUCTION-HEAT MELTING TREATMENT OF METAL-OXIDE-CONTAINING POWDERS AND DEVICE THEREFOR

TECHNICAL FIELD

This invention concerns a method of induction-heat melting treatment of powders and a device for this method, and to be more specific, concerns a method of induction-heat melting treatment of powders and a device for this method by which metals, contained in incineration ash, fly ash, and other forms of ash treated as general waste, can be recovered at high purity and high recovery and by which the incineration ash, fly ash, etc. can be rendered harmless.

BACKGROUND ARTS

Combustibles that have been separated from among industrial waste and domestic waste are incinerated in an incinerator after collection and subject to dumping, landfill treatment, etc. in the form of incineration ash. Meanwhile, when such wastes are combusted, they become so-called fly ash upon vaporization of various low-boiling-point components. Since this fly ash contains large amounts of metals, such as lead, cadmium, chromium, zinc, arsenic, mercury, etc., in comparison to the abovementioned incineration ash, it is collected by means of a bag filter, etc. equipped with slaked lime, etc. and thereby prevented from becoming dispersed into the external environment as exhaust combustion gas.

Since the fly ash that has thus been collected contains large amounts of metals as has been mentioned above, it not only cannot be subject to landfill disposal directly as general waste but also requires strict control in terms of environmental sanitation. Fly ash is thus subject to treatment, such as adjustment of the pH to 11 to 14, for making the metals insoluble in water and thereby preventing elution of the metals, and subsequent mixing with concrete and dumping at a disposal site as concrete-sealed matter.

However, large amounts of unreacted slake lime remain in fly ash, and when the pH of fly ash becomes high, lead and zinc, which are the amphoteric metals among the metals contained in fly ash, become more readily eluted in water. This has thus been a problem especially for landfill disposal.

Thus presently in order to prevent elution and render the fly ash harmless, fly ash is treated with organic chelates or inorganic chemicals, etc., which make use of crystallization reactions. However, such treatment methods have the following problems.

(1) Organic chelate products are decomposed by soil microbes, resulting in the elution of zinc and lead.
(2) Organic treatment products are dissolved by the humic acid in the soil, resulting in the elution of zinc and lead.
(3) Though products of treatment by inorganic chemicals are excellent in long term stability, the amount of treatment product increases, thus resulting in the shortening of the lifetimes of landfill disposal sites.

Also, since metals that have been sealed in concrete become readily eluted when the pH is lowered by acid rain, etc., methods for removing metals without fail from within fly ash have been demanded.

On the other hand, ash melting methods have been noted by various municipalities not only in terms of volume-reduction effects but also in that large merits are provided in terms of enabling the ash to be rendered into harmless matter with which there is no elution of metals, etc. and improving the recycling rate. However, ash melting furnaces, such as plasma melting furnaces, reverberatory melting furnaces, electric resistance melting furnaces, etc., which can be erected adjacent existing incineration furnaces, are all high in construction cost and running cost, etc. and this has been an impeding factor in the introduction and spreading of ash melting methods among municipalities.

As an example of application of an induction-heat melting treatment device to the melting of the abovementioned incineration ash and fly ash, the device of FIG. 8 has been proposed. As shown in FIG. 8, this induction-heat melting treatment device 100 is comprised of a ceramic shell part 102a of a large diameter (approximately 2 meters) and a ceramic lower part 102b, formed to have the shape of an inverted cone, and is equipped with a hopper 102, which is connected to a powder supplying pipe 101 at the upper end, and an induction heating coil 103, which surrounds the outer periphery of the cylindrical shell part 102a of the abovementioned hopper 102. The melt resulting from the melting of ash inside the abovementioned hopper 102 is supplied to a melt storage tank 105 via a conical liquid distributor 104, provided at the exit at the lower end of the abovementioned hopper.

However, the above-described induction-heat melting treatment device 100 shown in FIG. 8 had the following problems.

(1) Due to the poor heat conduction of ash, a large amount of time is required for all of the ash stored in the large-diameter hopper 102 to melt. The amount treated per unit time was thus low, the thermal efficiency was also low, and as a result, the running cost was high.
(2) Since the interiors of hopper 102 and melt storage tank 105 are at atmospheric pressure and since the area for vaporization of the metals in the melt after the melting of ash is not large, it was difficult to render the ash slag completely harmless by vaporization of the metals in the melt. The metals also could not be recovered at high purity and high recovery.
(3) Due to the poor heat conduction of ash, when attempts were made to increase the treatment rate of ash, hopper 102, etc. and other parts of the device had to be made large, leading to increased equipment cost.

SUMMARY OF THE INVENTION

An object of this invention is to provide a method of induction-heat melting treatment of powders and a device for this method, which solve the abovementioned problems of the prior art, enable the rendering of incineration ash, fly ash, and other ash harmless by favorable removal of the metals contained in the ash, enable the metals to be recovered at high purity and high recovery, are high in equipment productivity, and are low in running cost.

(First Aspect: Method of Induction-heat Melting Treatment)

The first aspect of this invention is a method of induction-heat melting treatment of metal-oxide-containing powders, which comprises a process in which a metal-oxide-containing powder is stored in a closed hopper, a process in which the abovementioned metal-oxide-containing powder that has been stored in the abovementioned closed hopper is supplied at a prescribed flow rate to an induction heating pipe, which is comprised of dielectric material and has been induction heated to or higher than a prescribed temperature, and the abovementioned metal-oxide-containing powder that falls through the abovementioned induction heating pipe is heated to be melted while at least a part of the metal oxides are reduced, a process in which the melt that has been obtained by melting is heated while being stored in a receiving container, made of dielectric material, to reduce the remaining metal oxides, a process in which the liquid-film-like melt flow that overflows and flows down from the abovementioned receiving container is exposed to a vacuum atmosphere to cause the metals in the melt to vaporize and thereby convey the metals along with the ascending evacuation flow, a process in which the metal vapor particles and/or the condensed metal particles in the abovementioned ascending evacuation flow are collected by means of an electric precipitation means, a process in which the melt flow that overflows and flows down from the abovementioned receiving container is received and stored in a melt storage tank, and a process in which the metal that has been collected by and has accumulated on the abovementioned electrostatic precipitation means is removed and recovered from the abovementioned precipitation means, and with which at least one of either the abovementioned induction heating pipe and the abovementioned receiving container is formed from carbon material or graphite material.

With this invention's method of induction-heat melting treatment of powders arranged as described above, incineration ash, fly ash, or other metal-oxide-containing powder, which has been vacuum dried in advance, is dropped at a prescribed flow rate through an induction heating pipe, comprised of dielectric material. The induction heating pipe, comprised of carbon material, graphite material, or other dielectric material, is heated by an induction heating coil, and by the radiant heat of the induction heating pipe that has been heated to a high temperature, the metal-oxide-containing powder is heated indirectly and the metal-oxide-containing powder is thereby melted while being reduced at least in part. When the abovementioned carbon material or graphite material, both of which are dielectric materials, is used as the material of the induction heating pipe, the metal-oxide-containing powder will be melted favorably since the reduction of the metal-oxide-containing powder will be promoted and the metal oxides will tend to be converted into metals more readily in comparison to the case of vacuum reduction by resistive heating without the use of a reducing agent. The abovementioned prescribed temperature is a temperature at which at least part of the metal oxides will be reduced by carbon or carbon monoxide. The abovementioned prescribed flow rate is a flow rate that matches the rates of such heating, reduction, melting, etc. Since a powder is thus dropped through an induction heating pipe heated to a high temperature and heated, reduced, and melted by the radiant heat, the abovementioned powder, which is poor in heat conduction, can be heated and melted efficiently and the equipment productivity (heat melting treatment amount per unit time) can be made high.

Other materials that can be used as the material of the induction heating pipe include high-melting-point metals, such as molybdenum, which is a dielectric material, and dielectric ceramic material, etc., and the same heating, reduction, and melting effects can also be obtained by adding a reducing material, such as carbon material, etc., in the abovementioned metal-oxide-containing powder.

The melt resulting from the melting is stored in a receiving container comprised of a dielectric material, such as that mentioned above. The receiving container comprised of dielectric material is heated by an induction heating coil and the melt in the high-temperature receiving container is heated further by conductive heat transfer and convective heat transfer to a temperature at which the melt will maintain adequate fluidity.

Also, since the highly fluid melt is made to overflow and flow down from the receiving container in the form of a liquid film and this liquid film is exposed to a prescribed vacuum atmosphere, the metals in the melt can be vaporized efficiently and at high purity.

Furthermore, since the metal vapor is carried along with the ascending evacuation flow and the metal vapor particles and/or condensed metal particles in the ascending evacuation flow are collected by the electric precipitation means, the metals can be collected and accumulated extremely efficiently while being kept at high purity and without becoming contaminated whatsoever.

Since the metals that have accumulated to a prescribed amount in the electric precipitation means is taken out from the electric precipitation means and removed and recovered from the electric precipitation means for example by heating and melting, metals of high purity can be recovered at high recovery. The electric precipitation means, which is regenerated upon recovery of the accumulated metals, is used repeatedly.

Meanwhile, the melt of the powder from which the metals have been vaporized and eliminated, is stored in the melt storage tank, and when the amount of stored melt reaches a prescribed amount, the melt is, for example, granulated by the water granulation method or treated as necessary by some other treatment method according to composition and use.

(First Aspect: Device for Induction-heat Melting Treatment)

This invention provides, as a first technical means for achieving the above-described object, a device for induction-heat melting treatment of metal-oxide-containing powders, the principal parts of which are comprised of a closed hopper, which stores a metal-oxide-containing powder, a heat-resistant piping, which is equipped with a means for controlling the flow rate of the abovementioned metal-oxide containing powder and supplies the abovementioned metal-oxide-containing powder from the abovementioned closed hopper to an induction heating pipe, an induction heating pipe, which is comprised of dielectric material and the inner peripheral surface of the upper end part of which contacts the outer peripheral surface of the lower end part of the abovementioned heat-resistant piping in a manner enabling sliding in the vertical direction, a raising/lowering drive mechanism, which holds the upper end part of the abovementioned induction heating pipe in a manner enabling raising and lowering, a receiving container, which is made of dielectric material and surrounds the lower part of the abovementioned induction heating pipe and receives the melt of the powder, melted in the abovementioned induction heating pipe, while letting the melt overflow, a cylindrical upper vacuum chamber, which encloses the lower part of the abovementioned heat-resistant piping, the abovementioned induction heating pipe, a part of the abovementioned raising/lowering mechanism, and the abovementioned receiving container, and is connected to an evacuation means, an induction heating coil, which is disposed so as to externally surround the positions of the abovementioned cylindrical upper vacuum chamber corresponding to the abovementioned induction heating pipe, an electric precipitation means, which is disposed above the abovementioned receiving container in the abovementioned cylindrical upper vacuum chamber so as to externally surround the abovementioned induction heating pipe and/or is disposed inside an evacuation pipe from the abovementioned cylindrical upper vacuum chamber and collects the metal vapor particles and/or the condensed metal particles resulting from vaporization from the liquid-film-like melt that overflows and flows down from the abovementioned receiving container, a tilting pan, which receives the melt that overflows and flows down from the abovementioned receiving container and is supported in a manner enabling tilting and return to the horizontal position, a tilting mechanism for the abovementioned tilting pan, a melt storage tank, which receives and stores the melt from the abovementioned tilting pan, and.

a lower vacuum chamber, which encloses the abovementioned tilting pan and melt storage tank and is connected to the lower end of the abovementioned cylindrical upper vacuum chamber.

Since this invention's device for induction-heat melting treatment of metal-oxide-containing powders is arranged in the above manner, it provides the same effects as the above-described method of induction-heat melting treatment of metal-oxide-containing powders by this invention.

As a second technical means, this invention's device for induction-heat melting treatment of metal-oxide-containing powders according to the first aspect, equipped with the above-described first technical means, is preferably arranged so that the abovementioned lower vacuum chamber is equipped with a partition plate, which divides the interior of the abovementioned lower vacuum chamber into an upper chamber that encloses the abovementioned tilting pan and a lower chamber that encloses the abovementioned melt storage tank, a through hole, which is provided in the abovementioned partition plate in order to cause the melt to flow down from the abovementioned tilting pan to the abovementioned melt storage tank, an opening/closing lid, which opens and closes the abovementioned through hole, an atmospheric inlet pipe, which is connected to the abovementioned lower chamber and is equipped with an atmospheric inlet valve, an evacuation pipe, which is connected to the abovementioned lower chamber, and an opening/closing door, which is provided at the side wall of the abovementioned lower chamber for moving the abovementioned melt storage tank in and out of the lower chamber.

With the above arrangement, when a prescribed amount of melt has accumulated in the melt storage tank, the tilting pan is returned to the horizontal position, the through hole of the partition plate of the lower vacuum chamber is closed by the circular lid while the melt is stored in the tilting pan, and the interiors of the upper chamber and the cylindrical upper vacuum chamber are kept at vacuum to enable induction-heat melting treatment of the metal-oxide-containing powder to be continued.

Also, upon stopping the evacuation via the evacuation pipe of the lower chamber and opening the atmospheric inlet valve to introduce atmosphere into the lower chamber and thereby returning the interior of the lower chamber to atmospheric pressure, the opening/closing door can be opened to draw the melt storage tank out of the lower chamber and carry in a spare melt storage tank into the lower chamber.

Thereafter, the opening/closing door and the atmospheric inlet valve are closed and the interior of the lower chamber is evacuated via the evacuation pipe of the lower chamber to enable the degree of vacuum to be raised until the interior of the lower chamber will be at the same pressure as the interior of the upper chamber.

The circular lid is then opened and the tilting pan is tilted again to cause the melt to flow down into the melt storage tank and thereby begin storage again, and during the induction-heat melting treatment of the powder, evacuation is continued via the evacuation pipe at the upper end of the cylindrical upper vacuum chamber and the evacuation pipe 15 of the lower chamber to enable the interiors of the cylindrical upper vacuum chamber and the lower vacuum chamber to be kept at a prescribed degree of vacuum.

As a third technical means, this invention's device according to the first aspect for induction-heat melting treatment of metal-oxide-containing powders that employs the above-described first technical means may be arranged so that the abovementioned lower vacuum chamber is equipped with a partition plate, which divides the interior of the abovementioned lower vacuum chamber into an upper chamber that encloses the abovementioned tilting pan and a lower chamber that encloses the abovementioned melt storage tank, a partition wall, which partitions the abovementioned lower chamber into the two parts of left and right lower chambers, left and right through holes, which are provided in the abovementioned partition plate in order to cause the melt to flow down from the abovementioned tilting pan to each of the melt storage tanks enclosed respectively in the abovementioned left and right lower chambers, opening/closing lids, which open and close the abovementioned left and right through holes, respectively, atmospheric inlet pipes, which are respectively equipped with atmospheric inlet valves and connected respectively to the abovementioned left and right lower chambers, evacuation pipes, which are connected respectively to the abovementioned left and right lower chambers, and opening/closing doors, which are provided at the side walls of the abovementioned left and right lower chambers, respectively, for enabling the abovementioned melt storage tanks to be moved in and out of the respective lower chambers.

With the above arrangement, when for example a prescribed amount of melt has accumulated in the melt storage tank inside the lower chamber at the right side, the tilting pan is returned once to the horizontal position, the opening/closing lid of the adjacently disposed left melt storage tank is opened while the melt is being stored in the tilting pan, and then the tilt of the tilting pan is switched so that the melt will flow into the left melt storage tank. The right melt storage tank is then cut off from the vacuum system by closing the through hole of the partition plate of the lower vacuum chamber by the circular lid so that the induction-heat melting treatment of the powder can be continued while keeping the interiors of the upper chamber and the cylindrical upper vacuum chamber at vacuum.

Also, upon stopping the evacuation via the evacuation pipe of the right lower chamber and opening the atmospheric inlet valve to introduce atmosphere into the lower chamber and returning the interior of the lower chamber to atmospheric pressure, the opening/closing door can be opened to enable the melt storage tank to be drawn outside the lower chamber and a spare melt storage tank to be carried into the lower chamber.

Subsequently, by closing the opening/closing door and the atmospheric inlet valve of the right lower chamber prior to accumulation of a prescribed amount of melt in the left melt storage tank and then evacuating the interior of the lower chamber via the evacuation pipe of the lower chamber, the degree of vacuum in the lower chamber can be increased until the pressure becomes equivalent to that of the interior of the upper chamber.

The circular lid is then opened, the tilting pan is tilted again towards the melt storage tank in the right lower chamber to start storage again, and during the induction-heat melting treatment of the powder, evacuation is continued via the evacuation pipe at the upper end of the cylindrical upper vacuum chamber and the evacuation pipe of the lower vacuum chamber to enable the interiors of the cylindrical upper vacuum chamber and the lower vacuum chamber to be maintained at a prescribed level.

By thus simply switching the tilt of the tilting pan in the direction of the melt storage tank in which the melt is to be stored, the induction-heat melting treatment of the powder and the drawing out of the melt to the exterior can be carried out in a continuous manner.

As a fourth technical means, this invention's device according to the first aspect for induction-heat melting treatment of metal-oxide-containing powders that employs any of the above-described first to third technical means is preferably arranged with the abovementioned induction heating pipe and the abovementioned receiving container being formed from carbon material, graphite material, or high-melting-point metal.

Since carbon materials and graphite materials are high in dielectric characteristics and electrical conductivity and are also strong against chemical erosion by the metal oxide melt, they are suitable as materials for the induction heating pipe and as materials for the receiving container. Also, these materials are favorable in that they maintain a reducing atmosphere inside the induction heating pipe and promote the action of reduction of the metal oxides. Furthermore, these materials are significantly economical in comparison to molybdenum and other high-melting-point metals.

Among high-melting-point metals, molybdenum is preferable. Since molybdenum is high in dielectric characteristics and conductivity, strong against chemical erosion by metal oxide melts, and is furthermore less likely than tungsten, etc. to undergo reaction with the carbon material used as the reducing agent, degradation of strength due to carburizing, or degradation of strength due to reaction with the iron in incineration ash, it is suitable as the material for the induction heating pipe and the material for the receiving container. Furthermore, molybdenum is high in high-temperature strength in comparison to carbon materials and graphite materials and, though having the problem of being expensive, is favorable as the material for the induction heating pipe and the material for the receiving container.

As a fifth technical means, this invention's device according to the first aspect for induction-heat melting treatment of metal-oxide-containing powders that employs any of the above-described first to fourth technical means may be arranged with the abovementioned induction heating pipe and the abovementioned receiving container being formed from dielectric ceramic material.

Dielectric ceramic materials are favorable in that they are low in thermal expansion coefficient in comparison to carbon materials, graphite materials, and high-melting-point metals, can be readily connected to the heat-resistant piping for supplying the powder, and enable highly precise adjustment of the gap between the below-described protruding part, to be provided at the inner bottom surface part of the receiving container that is immediately below the induction heating pipe, and the lower end part of the induction heating pipe.

As a sixth technical means, this invention's device according to the first aspect for induction-heat melting treatment of metal-oxide-containing powders that employs any of the above-described first to fifth technical means is preferably arranged with a protruding part being equipped at the inner bottom surface part of the abovementioned receiving container that is immediately below the abovementioned induction heating pipe and the abovementioned raising/lowering drive mechanism being comprised of a servo motor.

With such an arrangement, the cross-sectional area of the gap, between the outer surface of the protruding part, provided at the inner bottom surface part of the abovementioned receiving container that is immediately below the abovementioned induction heating pipe, and the inner surface of the lower end part of the induction heating pipe or the edge of the inner surface of the lower end part of the induction heating pipe, can be adjusted at high precision by the raising and lowering movement of the induction heating pipe. As a result, the liquid-film-like melt that over flows and flows down from the receiving container can be made to overflow at a flow rate that is suited for the vaporization of metal upon exposure of the melt to vacuum. The rate of overflow of the melt is thus prevented from becoming so high that the rendering of the melt harmless will be made inadequate by the melt flowing into the lower melt storage tank without adequate vaporization of the metals in the melt. Also, since the rate of overflow will be prevented from becoming so small that the amount treated per unit time will become smaller than the capacity of the device, the equipment productivity of the device can be raised to the maximum.

As a seventh technical means, this invention's device according to the first aspect for induction-heat melting treatment of metal-oxide-containing powders that employs any of the above-described first to sixth technical means is preferably arranged with the abovementioned receiving container being made to have an inverted trapezoidal cross-sectional shape and have grooves formed at suitable intervals along the circumference of the upper end thereof and/or being equipped, at the upper end of the side wall thereof, with a flange part that extends outward with grooves being formed at suitable intervals along the circumference of the abovementioned flange part.

With the above arrangement, the melt that overflows and flows down from the upper end of the side wall of the receiving container can be prevented from trailing along the outer surface of the side wall and can thus be made to form a liquid film that is separated from the outer surface of the side wall of the receiving container. As a result, the surface area of the liquid film that contacts the vacuum atmosphere will be approximately doubled, thus increasing the rate of vaporization of metal from the liquid-film-like melt and approximately doubling the amount treated per unit time.

Also, by providing grooves on the surface at which the liquid overflows from the upper end of the side wall of the receiving container and thereby varying the rate of overflow of liquid at each groove, openings are formed so that the metal vapor will not be trapped in the space between the liquid film, which falls like a waterfall from the upper end of the side wall of the receiving container, and the outer surface of the side wall of the receiving container and be prevented from escaping to the exterior.

In the case where there are no grooves, since the periphery of the receiving container will be covered entirely by the liquid film that falls like a waterfall from the abovementioned upper end of the side wall and the trapped metal vapor will not be able to escape to the exterior even when there is an ascending evacuation flow, the rate of vaporization of the metal will be small.

As an eighth technical means, this invention's device according to the first aspect for induction-heat melting treatment of metal-oxide-containing powders that employs any of the above-described first to seventh technical means may be arranged with notched parts being provided at suitable intervals along the circumference of the upper end of the side wall of the abovementioned receiving container.

With the above arrangement, the flow rate of the melt that flows outward from the notches will be increased in comparison to the case where there are no notches, provided that the flow rate of the melt that overflows and flows down from the upper end of the side wall of the receiving container is the same in both cases. The melt that overflows and flows down can thus be prevented from trailing along the outer surface of the side wall of the receiving container and can be made to form a liquid film that is separated from the outer surface of the side wall. As a result, the surface area by which the liquid film contacts the vacuum atmosphere is increased, thereby enabling the rate of vaporization of metal from the liquid-film-like melt to be made greater and the amount treated per unit time to be increased.

(Second Aspect: Method of Induction-heat Melting Treatment)

The second first aspect of this invention is a method of induction-heat melting treatment of metal-oxide-containing powders, which comprises a process in which a metal-oxide-containing powder is stored in a closed hopper, a process in which the abovementioned metal-oxide-containing powder that has been stored in the abovementioned closed hopper is supplied at a prescribed flow rate to an induction heating pipe, which is comprised of dielectric material and has been induction heated to or higher than a prescribed temperature, and the abovementioned metal-oxide-containing powder that falls through the abovementioned induction heating pipe is heated to be melted while at least a part of the metal oxides are reduced, a process in which the melt that has been obtained by melting is heated while being stored in a packing, made of dielectric material, to reduce the remaining metal oxides, a process in which the liquid-film-like melt flow that overflows and flows down from the abovementioned packing is exposed to a vacuum atmosphere to cause the metals in the melt to vaporize and thereby convey the metals along with the ascending evacuation flow, a process in which the metal vapor particles and/or the condensed metal particles in the abovementioned ascending evacuation flow are collected by means of an electric precipitation means, a process in which the melt flow that overflows and flows down from the abovementioned packing is received and stored in a melt storage tank, and a process in which the metal that has been collected by and has accumulated on the abovementioned electrostatic precipitation means is removed and recovered from the abovementioned precipitation means, and with which at least one of either the abovementioned induction heating pipe and the abovementioned packing is formed from carbon material or graphite material.

With this invention's method according to the second aspect of induction-heat melting treatment of powders arranged as described above, incineration ash, fly ash, or other metal-oxide-containing powder, which has been vacuum dried in advance, is dropped at a prescribed flow rate through an induction heating pipe, comprised of dielectric material. The induction heating pipe, comprised of carbon material, graphite material, or other dielectric material, is heated by an induction heating coil, and by the radiant heat of the induction heating pipe that has been heated to a high temperature, the metal-oxide-containing powder is heated indirectly and the metal-oxide-containing powder is thereby melted while being reduced at least in part. When the abovementioned carbon material or graphite material, both of which are dielectric materials, is used as the material of the induction heating pipe, the metal-oxide-containing powder will be melted favorably since the reduction of the metal-oxide-containing powder will be promoted and the metal oxides will tend to be converted into metals more readily in comparison to the case of vacuum reduction by resistive heating without the use of a reducing agent. The abovementioned prescribed temperature is a temperature at which at least part of the metal oxides will be reduced by carbon or carbon monoxide. The abovementioned prescribed flow rate is a flow rate that matches the rates of such heating, reduction, melting, etc. Since a powder is thus dropped through an induction heating pipe heated to a high temperature and heated, reduced, and melted by the radiant heat, the abovementioned powder, which is poor in heat conduction, can be heated and melted efficiently and the equipment productivity (heat melting treatment amount per unit time) can be made high.

Other materials that can be used as the material of the induction heating pipe include high-melting-point metals, such as molybdenum, which is a dielectric material, and dielectric ceramic material, etc., and the same heating, reduction, and melting effects can also be obtained by adding a reducing material, such as carbon material, etc., in the abovementioned metal-oxide-containing powder.

The melt resulting from the melting is stored in a packing comprised of a dielectric material, such as that mentioned above. The packing comprised of dielectric material is heated by an induction heating coil and the melt in the high-temperature packing is heated further by conductive heat transfer and convective heat transfer to a temperature at which the melt will maintain adequate fluidity.

Also, since the highly fluid melt is made to overflow and flow down from the packing in the form of a liquid film and this liquid film is exposed to a prescribed vacuum atmosphere, the metals in the melt can be vaporized efficiently and at high purity.

Furthermore, since the metal vapor is carried along with the ascending evacuation flow and the metal vapor particles and/or condensed metal particles in the ascending evacuation flow are collected by the electric precipitation means, the metals can be collected and accumulated extremely efficiently while being kept at high purity and without becoming contaminated whatsoever.

Since the metals that have accumulated to a prescribed amount in the electric precipitation means is taken out from the electric precipitation means and removed and recovered from the electric precipitation means for example by heating and melting, metals of high purity can be recovered at high recovery. The electric precipitation means, which is regenerated upon recovery of the accumulated metals, is used repeatedly.

Meanwhile, the melt of the powder from which the metals have been vaporized and eliminated, is stored in the melt storage tank, and when the amount of stored melt reaches a prescribed amount, the melt is, for example, granulated by the water granulation method or treated as necessary by some other treatment method according to composition and use.

(Second Aspect: Device for Induction-heat Melting Treatment)

This invention provides, as a second technical means according to the second aspect for achieving the above-described object, a device for induction-heat melting treatment of metal-oxide-containing powders, the principal parts of which are comprised of a closed hopper, which stores a metal-oxide-containing powder, a heat-resistant piping, which is equipped with a means for controlling the flow rate of the abovementioned metal-oxide containing powder and supplies the abovementioned metal-oxide-containing powder from the abovementioned closed hopper to an induction heating pipe, an induction heating pipe, which is comprised of dielectric material and the inner peripheral surface of the upper end part of which contacts the outer peripheral surface of the lower end part of the abovementioned heat-resistant piping in a manner enabling sliding in the vertical direction, a raising/lowering drive mechanism, which holds the upper end part of the abovementioned induction heating pipe in a manner enabling raising and lowering, a packing, which is made of dielectric material and surrounds the lower part of the abovementioned induction heating pipe and receives the melt of the powder, melted in the abovementioned induction heating pipe, while letting the melt overflow, a cylindrical upper vacuum chamber, which encloses the lower part of the abovementioned heat-resistant piping, the abovementioned induction heating pipe, a part of the abovementioned raising/lowering mechanism, and the abovementioned packing, and is connected to an evacuation means, an induction heating coil, which is disposed so as to externally surround the positions of the abovementioned cylindrical upper vacuum chamber corresponding to the abovementioned induction heating pipe, an electric precipitation means, which is disposed above the abovementioned packing in the abovementioned cylindrical upper vacuum chamber so as to externally surround the abovementioned induction heating pipe and/or is disposed inside an evacuation pipe from the abovementioned cylindrical upper vacuum chamber and collects the metal vapor particles and/or the condensed metal particles resulting from vaporization from the liquid-film-like melt that overflows and flows down from the abovementioned packing, a tilting pan, which receives the melt that overflows and flows down from the abovementioned packing and is supported in a manner enabling tilting and return to the horizontal position, a tilting mechanism for the abovementioned tilting pan, a melt storage tank, which receives and stores the melt from the abovementioned tilting pan, and a lower vacuum chamber, which encloses the abovementioned tilting pan and melt storage tank and is connected to the lower end of the abovementioned cylindrical upper vacuum chamber.

Since this invention's device for induction-heat melting treatment of metal-oxide-containing powders is arranged in the above manner, it provides the same effects as the above-described method of induction-heat melting treatment of metal-oxide-containing powders by this invention.

As a second technical means, this invention's device for induction-heat melting treatment of metal-oxide-containing powders according to the second aspect, equipped with the above-described second technical means, is preferably arranged so that the abovementioned lower vacuum chamber is equipped with a partition plate, which divides the interior of the abovementioned lower vacuum chamber into an upper chamber that encloses the abovementioned tilting pan and a lower chamber that encloses the abovementioned melt storage tank, a through hole, which is provided in the abovementioned partition plate in order to cause the melt to flow down from the abovementioned tilting pan to the abovementioned melt storage tank, an opening/closing lid, which opens and closes the abovementioned through hole, an atmospheric inlet pipe, which is connected to the abovementioned lower chamber and is equipped with an atmospheric inlet valve, an evacuation pipe, which is connected to the abovementioned lower chamber, and an opening/closing door, which is provided at the side wall of the abovementioned lower chamber for moving the abovementioned melt storage tank in and out of the lower chamber.

With the above arrangement, when a prescribed amount of melt has accumulated in the melt storage tank, the tilting pan is returned to the horizontal position, the through hole of the partition plate of the lower vacuum chamber is closed by the circular lid while the melt is stored in the tilting pan, and the interiors of the upper chamber and the cylindrical upper vacuum chamber are kept at vacuum to enable induction-heat melting treatment of the metal-oxide-containing powder to be continued.

Also, upon stopping the evacuation via the evacuation pipe of the lower chamber and opening the atmospheric inlet valve to introduce atmosphere into the lower chamber and thereby returning the interior of the lower chamber to atmospheric pressure, the opening/closing door can be opened to draw the melt storage tank out of the lower chamber and carry in a spare melt storage tank into the lower chamber.

Thereafter, the opening/closing door and the atmospheric inlet valve are closed and the interior of the lower chamber is evacuated via the evacuation pipe of the lower chamber to enable the degree of vacuum to be raised until the interior of the lower chamber will be at the same pressure as the interior of the upper chamber.

The circular lid is then opened and the tilting pan is tilted again to cause the melt to flow down into the melt storage tank and thereby begin storage again, and during the induction-heat melting treatment of the powder, evacuation is continued via the evacuation pipe at the upper end of the cylindrical upper vacuum chamber and the evacuation pipe 15 of the lower chamber to enable the interiors of the cylindrical upper vacuum chamber and the lower vacuum chamber to be kept at a prescribed degree of vacuum.

As a third technical means, this invention's device according to the second aspect for induction-heat melting treatment of metal-oxide-containing powders that employs the above-described second technical means may be arranged so that the abovementioned lower vacuum chamber is equipped with a partition plate, which divides the interior of the abovementioned lower vacuum chamber into an upper chamber that encloses the abovementioned tilting pan and a lower chamber that encloses the abovementioned melt storage tank, a partition wall, which partitions the abovementioned lower chamber into the two parts of left and right lower chambers, left and right through holes, which are provided in the abovementioned partition plate in order to cause the melt to flow down from the abovementioned tilting pan to each of the melt storage tanks enclosed respectively in the abovementioned left and right lower chambers, opening/closing lids, which open and close the abovementioned left and right through holes, respectively, atmospheric inlet pipes, which are respectively equipped with atmospheric inlet valves and connected respectively to the abovementioned. left and right lower chambers, evacuation pipes, which are connected respectively to the abovementioned left and right lower chambers, and opening/closing doors, which are provided at the side walls of the abovementioned left and right lower chambers, respectively, for enabling the abovementioned melt storage tanks to be moved in and out of the respective lower chambers.

With the above arrangement, when for example a prescribed amount of melt has accumulated in the melt storage tank inside the lower chamber at the right side, the tilting pan is returned once to the horizontal position, the opening/closing lid of the adjacently disposed left melt storage tank is opened while the melt is being stored in the tilting pan, and then the tilt of the tilting pan is switched so that the melt will flow into the left melt storage tank. The right melt storage tank is then cut off from the vacuum system by closing the through hole of the partition plate of the lower vacuum chamber by the circular lid so that the induction-heat melting treatment of the powder can be continued while keeping the interiors of the upper chamber and the cylindrical upper vacuum chamber at vacuum.

Also, upon stopping the evacuation via the evacuation pipe of the right lower chamber and opening the atmospheric inlet valve to introduce atmosphere into the lower chamber and returning the interior of the lower chamber to atmospheric pressure, the opening/closing door can be opened to enable the melt storage tank to be drawn outside the lower chamber and a spare melt storage tank to be carried into the lower chamber.

Subsequently, by closing the opening/closing door and the atmospheric inlet valve of the right lower chamber prior to accumulation of a prescribed amount of melt in the left melt storage tank and then evacuating the interior of the lower chamber via the evacuation pipe of the lower chamber, the degree of vacuum in the lower chamber can be increased until the pressure becomes equivalent to that of the interior of the upper chamber.

The circular lid is then opened, the tilting pan is tilted again towards the melt storage tank in the right lower chamber to start storage again, and during the induction-heat melting treatment of the powder, evacuation is continued via the evacuation pipe at the upper end of the cylindrical upper vacuum chamber and the evacuation pipe of the lower vacuum chamber to enable the interiors of the cylindrical upper vacuum chamber and the lower vacuum chamber to be maintained at a prescribed level.

By thus simply switching the tilt of the tilting pan in the direction of the melt storage tank in which the melt is to be stored, the induction-heat melting treatment of the powder and the drawing out of the melt to the exterior can be carried out in a continuous manner.

As a fourth technical means, this invention's device according to the second aspect for induction-heat melting treatment of metal-oxide-containing powders that employs any of the above-described second to third technical means is preferably arranged with the abovementioned induction heating pipe and the abovementioned packing being formed from carbon material, graphite material, or high-melting-point metal.

Since carbon materials and graphite materials are high in dielectric characteristics and electrical conductivity and are also strong against chemical erosion by the metal oxide melt, they are suitable as materials for the induction heating pipe and as materials for the packing. Also, these materials are favorable in that they maintain a reducing atmosphere inside the induction heating pipe and promote the action of reduction of the metal oxides. Furthermore, these materials are significantly economical in comparison to molybdenum and other high-melting-point metals.

Among high-melting-point metals, molybdenum is preferable. Since molybdenum is high in dielectric characteristics and conductivity, strong against chemical erosion by metal oxide melts, and is furthermore less likely than tungsten, etc. to undergo reaction with the carbon material used as the reducing agent, degradation of strength due to carburizing, or degradation of strength due to reaction with the iron in incineration ash, it is suitable as the material for the induction heating pipe and the material for the packing. Furthermore, molybdenum is high in high-temperature strength in comparison to carbon materials and graphite materials and, though having the problem of being expensive, is favorable as the material for the induction heating pipe and the material for the packing.

As a fifth technical means, this invention's device according to the second aspect for induction-heat melting treatment of metal-oxide-containing powders that employs any of the above-described second to fourth technical means may be arranged with the abovementioned induction heating pipe and the abovementioned packing being formed from dielectric ceramic material.

Dielectric ceramic materials are favorable in that they are low in thermal expansion coefficient in comparison to carbon materials, graphite materials, and high-melting-point metals, can be readily connected to the heat-resistant piping for supplying the powder, and enable highly precise adjustment of the gap between the below-described protruding part, to be provided at the inner bottom surface part of the packing that is immediately below the induction heating pipe, and the lower end part of the induction heating pipe.

As a sixth technical means, this invention's device according to the second aspect for induction-heat melting treatment of metal-oxide-containing powders that employs any of the above-described second to fifth technical means is preferably arranged with the abovementioned raising/lowering drive mechanism being comprised of a servo motor.

With such an arrangement, the cross-sectional area of the gap, between the outer surface of the protruding part, provided at the center of abovementioned packing that is immediately below the abovementioned induction heating pipe, and the inner surface of the lower end part of the induction heating pipe or the edge of the inner surface of the lower end part of the induction heating pipe, can be adjusted at high precision by the raising and lowering movement of the induction heating pipe. As a result, the liquid-film-like melt that overflows and flows down from the packing can be made to overflow at a flow rate that is suited for the vaporization of metal upon exposure of the melt to vacuum. The rate of overflow of the melt is thus prevented from becoming so high that the rendering of the melt harmless will be made inadequate by the melt flowing into the lower melt storage tank without adequate vaporization of the metals in the melt. Also, since the rate of overflow will be prevented from becoming so small that the amount treated per unit time will become smaller than the capacity of the device, the equipment productivity of the device can be raised to the maximum.

As a seventh technical means, this invention's device according to the second aspect for induction-heat melting treatment of metal-oxide-containing powders that employs any of the above-described second to sixth technical means is preferably arranged with the abovementioned packing composed of a protruding part at the center thereof, with a plurality of circular or semicircular pores around the outer circumference thereof and a circular plate having a circular pore at the center thereof, and a downward slope from the outer circumference to the center pore, placed via a gap, and the abovementioned packing being in contact with the lower inner wall of said cylindrical upper vacuum chamber.

With such an arrangement, the cross-sectional area of the gap, between the outer surface of the protruding part, provided at the center of abovementioned packing that is immediately below the abovementioned induction heating pipe, and the inner surface of the lower end part of the induction heating pipe or the edge of the inner surface of the lower end part of the induction heating pipe, can be adjusted at high precision by the raising and lowering movement of the induction heating pipe via the servo motor. As a result, the liquid-film-like melt that overflows and flows down from the packing can be made to overflow at a flow rate that is suited for the vaporization of metal upon exposure of the melt to vacuum. The rate of overflow of the melt is thus prevented from becoming so high that the rendering of the melt harmless will be made inadequate by the melt flowing into the lower melt storage tank without adequate vaporization of the metals in the melt. Also, since the rate of overflow will be prevented from becoming so small that the amount treated per unit time will become smaller than the capacity of the device, the equipment productivity of the device can be raised to the maximum.

During the course of the liquid flowing on the slope of the packing, liquid-film can be produced. As a result, the surface area of the liquid film in contact with the vacuum atmosphere becomes large, making it possible to accelerate the vaporization of the metal from the melt, leading to a larger treating amount per unit period.

Also, by providing gaps between the cap and plate, the passage of the liquid flowing through the packing becomes better.

Since all of the melt supplied flows on the slope of the packing in a liquid-film like state, the surface area of the melt with the vacuum atmosphere does not become small like the case of utilizing the receiving container.

In the case of receiving the melt by the receiving container, the surface area of the liquid per unit volume becomes small and, thus, the metal vapor becomes difficult to be discharged out, resulting in low vaporization rate of the metal.

As an eighth technical means, this invention's device according to the second aspect for induction-heat melting treatment of metal-oxide-containing powders that employs any of the above-described first to seventh technical means may be arranged with packing composed of an uneven packing material in which when the typical diameter is taken as the same as the sphere, the circumference ratio relative to the cross-section of the material is longer than the sphere, and a packing support, and the abovementioned packing being supported on the lower inner wall of said cylindrical upper vacuum chamber via the packing support.

With the above arrangement, by passing the melt through the packing layer supported on the lower inner wall of said cylindrical upper vacuum chamber via the packing support having the packing material in which when the typical diameter is taken as the same as the sphere, the circumference ratio relative to the cross-section of the material is longer than the sphere packed therein, the liquid-film can be formed on the surface of the packing material. By shaping the packing material into an uneven form, the pressure loss during the course of the melt flowing on the packing can be reduced. As a result, the surface area of the liquid-film in contact with the vacuum atmosphere can be increased, making it possible to accelerate the vaporization of the metal from the melt, leading to a larger treating amount per unit period.

Best Modes for Carrying out the Invention

This invention's device for induction-heat melting treatment of metal-oxide-containing powders shall now be described with reference to the attached drawings.

(First Aspect)

Figure 1:
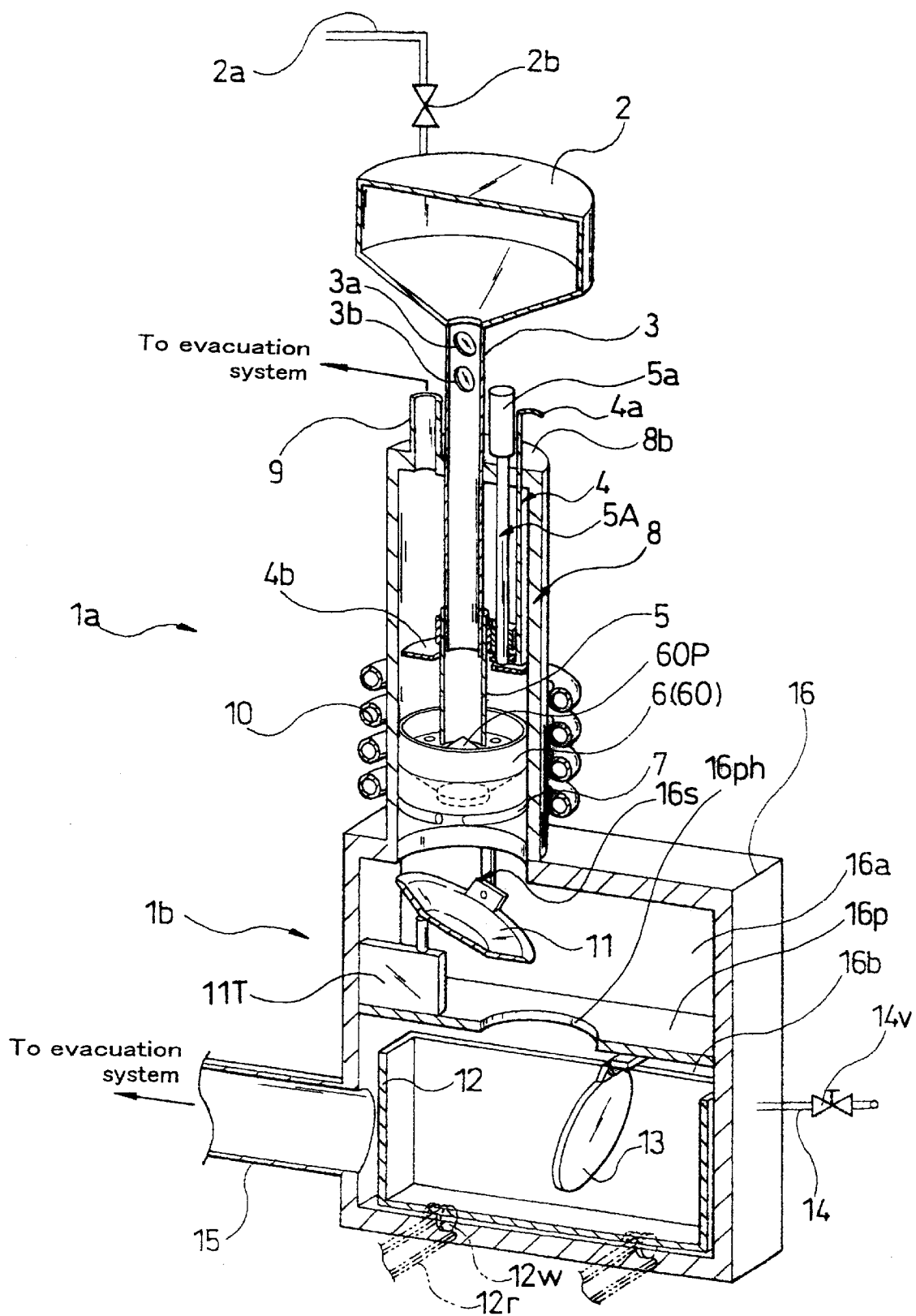
FIG. 1 is a cutaway perspective view, which shows the general arrangement of the entirety of the first embodiment of this invention's device according to the first aspect for induction-heat melting treatment of metal-oxide-containing powders.

As shown in FIG. 1, this invention's device 1 for induction-heat melting treatment of metal-oxide-containing powders is largely comprised of a powder melting part 1a and a melt storage and extraction part 1b.

The principal parts of powder melting part 1a are comprised of a transfer pipe 2a, which transfers a metal-oxide-containing powder that has been dried by an unillustrated vacuum drier, a rotary valve 2b, which is disposed in the middle of the abovementioned transfer pipe 2a, the abovementioned closed hopper 2, which is connected to the terminal end of the abovementioned transfer pipe 2a and with which the cross-section of the lower part that receives and stores the abovementioned metal-oxide-containing powder has the shape of an inverted cone, a heat-resistant piping 3, which is comprised of a ceramic material or a water-cooled double metal pipe, is connected to the lower end of the abovementioned closed hopper 2, and supplies the powder to induction heating pipe 5, an induction heating pipe 5, which is comprised of a dielectric material and the inner peripheral surface of the upper end part of which comes in contact with the outer peripheral surface of the abovementioned heat-resistant piping 3 in a manner enabling sliding in the vertical direction, a raising/lowering drive mechanism 5A, which supports the upper end part of the abovementioned induction heating pipe 5 in a manner enabling raising and lowering, a receiving container 6, which surrounds the lower part of the abovementioned induction heating pipe 5 and is comprised of a dielectric material that receives the melt of the abovementioned metal-oxide-containing powder that has been melted inside the abovementioned induction heating pipe 5, a cylindrical upper vacuum chamber 8, which encloses the lower part of the abovementioned heat-resistant piping 3, the abovementioned induction heating pipe 5, a part of the abovementioned raising/lowering drive mechanism 5A, and the receiving container 6 and with which an evacuation pipe 9 at the upper end thereof is connected to an unillustrated evacuation means, an induction heating coil 10, which is disposed so as to externally surround the positions of the abovementioned cylindrical upper vacuum chamber 8 corresponding to the abovementioned induction heating pipe 5, and an electric precipitation means 4, which is disposed above the abovementioned receiving container 6 inside the abovementioned cylindrical vacuum chamber 8 so as to externally surround the abovementioned induction heating pipe 5 and collects the metal vapor particles and/or condensed metal particles resulting from vaporization from the liquid-film-like melt that overflows and flows down from the abovementioned receiving container 6.

The principal parts of the melt storage and extraction part 1b are comprised of a tilting pan 11, which receives the melt that overflows and flows down from the abovementioned receiving container 6 and is supported in a manner enabling tilting and return to the horizontal position, a tilting mechanism 11T for the abovementioned tilting pan 11, a melt storage tank 12, which receives and stores the melt that flows down from the abovementioned tilting pan 11, and a lower vacuum chamber 16, which encloses the abovementioned tilting pan 11 and melt storage tank 12 and is connected to the lower end of the abovementioned cylindrical upper vacuum chamber 8.

The above-described embodiment furthermore has the following specific arrangements and exhibits the following actions.

Heat resistance and material strength are required of heat-resistant piping 3 since it receives much radiant heat from induction heating pipe 5 that is connected to its lower end part. A water-cooled double metal pipe or a ceramic pipe is therefore used.

In the interior of the upper part of heat-resistant piping 3 are axially pivoted two dampers (butterfly valves) 3a and 3b, which are comprised of ceramic material, watercooled metal panels, or high-melting-point metal and are for the flow rate control of the powder. Dampers 3a and 3b are formed as disks of diameters that are slightly smaller than the inner diameter of heat-resistant piping 3, have their rotating shafts connected to unillustrated actuators at the exterior of heat-resistant piping 3, and are thereby rotated to perform flow rate control of the powder.

Figure 2:
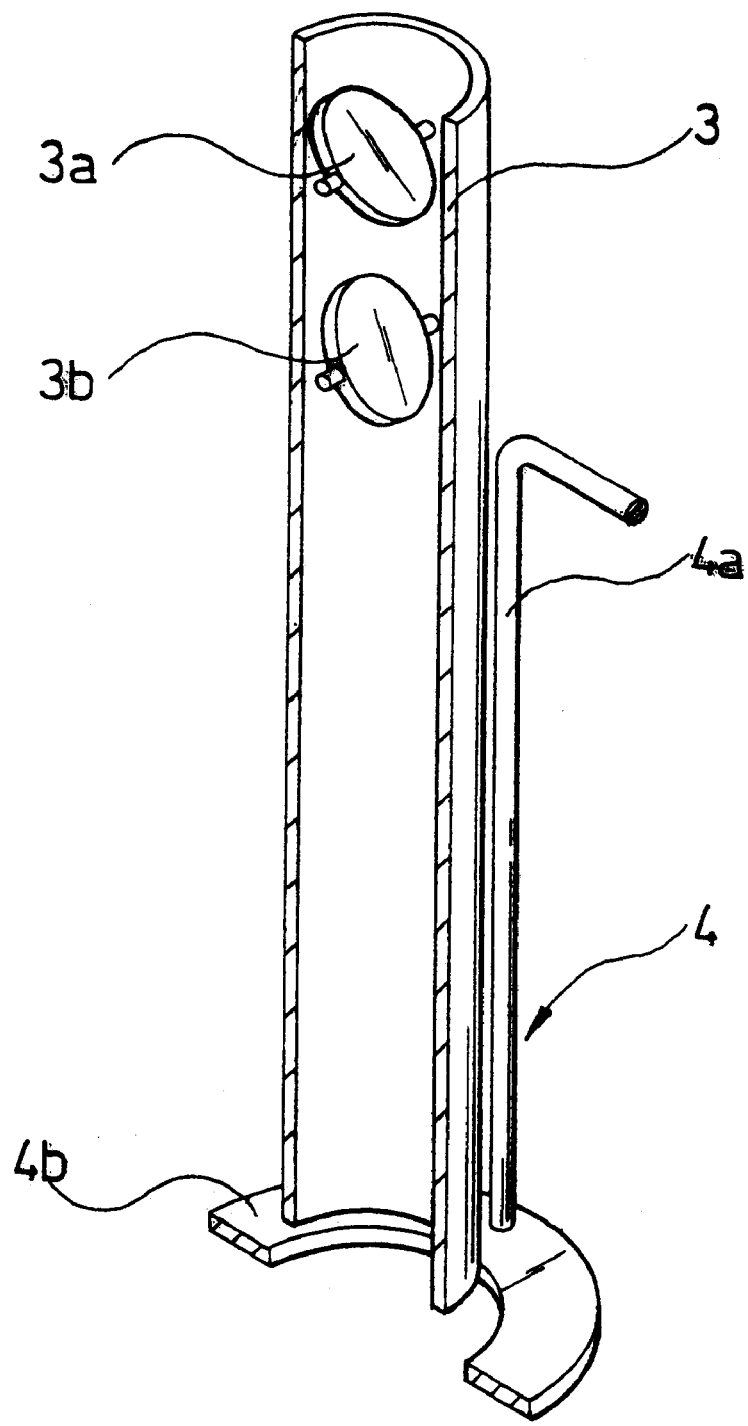
FIG. 2 is a cutaway perspective view, which shows the heat-resistant piping and the electric precipitation means.

Also as shown in FIGS. 1 and 2, at the outer periphery of the lower end part of heat-resistant piping 3 and the upper end part of induction heating pipe 5 is provided the electric precipitation means 4, comprised of an. annular electrode plate 4b, which is disposed so as to surround the abovementioned parts, and a pair of cylindrical rod conductors 4a, which support the abovementioned annular electrode plate 4b and supply power. Small gaps, through which the ascending stream of the various evacuated gases flow, are provided between the abovementioned annular electrode plate 4b and the outer peripheral surface of induction heating pipe 5 and the inner wall surface of cylindrical vacuum chamber 8, and the ascending evacuated gas stream collides with the abovementioned annular electrode plate to be collected of the metal vapor particles and/or the condensed metal particles and flows thereafter through the abovementioned gaps to the evacuation pipe 9 at the upper end of cylindrical vacuum chamber 8.

Induction heating pipe 5 is cylindrical and the inner peripheral surface thereof is made to contact the outer peripheral surface of the lower end part of the abovementioned heat-resistant piping 3 in a manner enabling sliding in the vertical direction. Carbon material or graphite material, which is good in dielectric characteristics and conductivity and can be heated rapidly by induction heating, is used for example as the material of induction heating pipe 5. As alternative materials to carbon material or graphite material, a high-melting-point metal, such as molybdenum, etc., or a dielectric ceramic material, etc. may also be used. In this case, it is preferable to perform induction heating upon separately adding a reducing agent, such as carbon material, etc., to the metal-oxide-containing powder since the reaction temperature can then be made lower.

Figure 3:
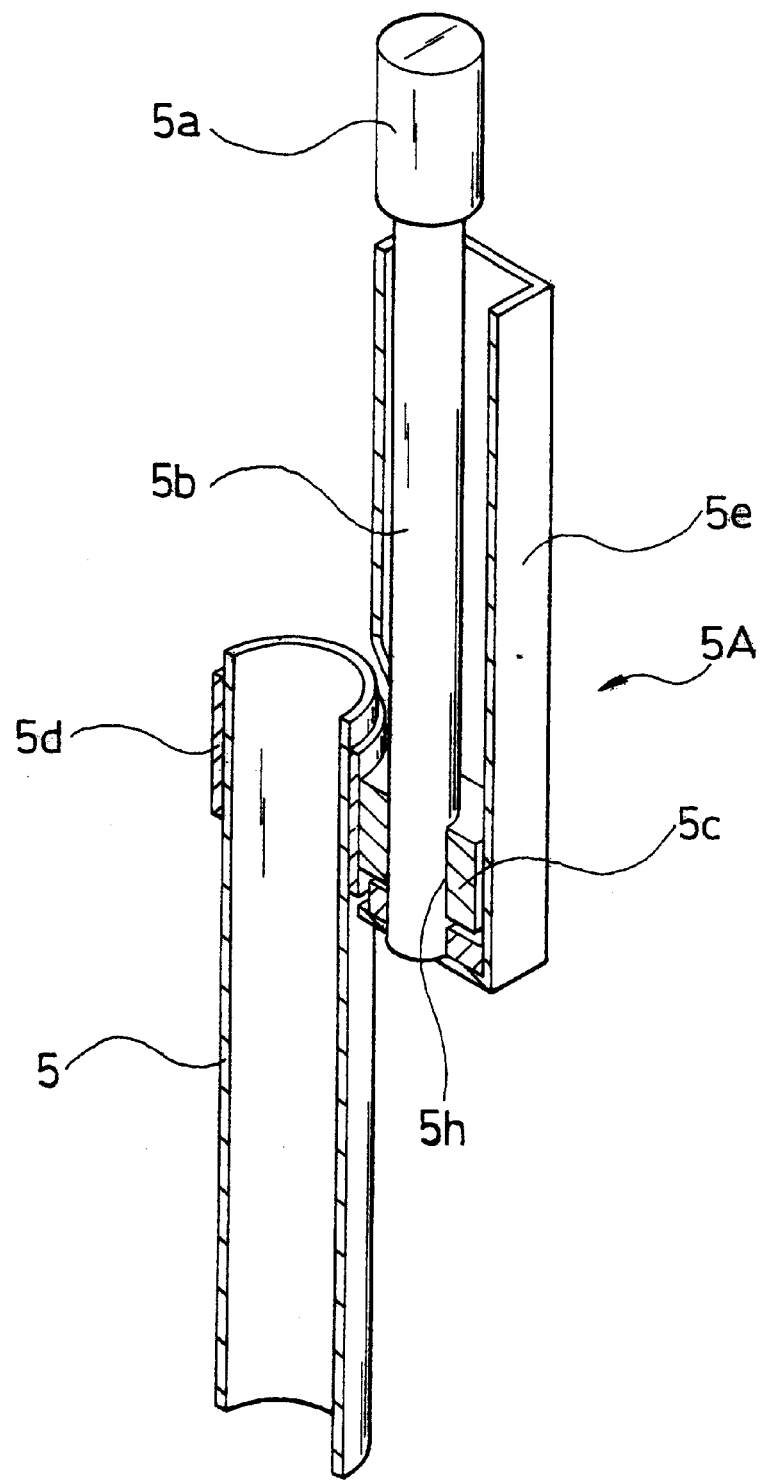
FIG. 3 is a partially cutaway perspective view, which shows the induction heating pipe and the raising/lowering drive mechanism therefor.

As shown in FIG. 3, the raising/lowering drive mechanism 5A of induction heating pipe 5 is comprised of a clamp part 5d, which holds the outer peripheral surface of the upper end part of induction heating pipe 5, a block member 5c, which extends in the lateral direction perpendicular to the outer peripheral surface of the abovementioned clamp part 5d with one end thereof being fixed to a part of the abovementioned outer peripheral surface and is provided with a vertical through hole 5h having a female thread formed therein, a screw rod 5b, having a male thread formed thereon that engages with the female thread of the abovementioned vertical through hole 5h of the abovementioned block member 5c, a servo motor 5a, the rotating shaft of which is connected to the upper end of the abovementioned screw rod 5b, and a heat shielding case 5e, which has the shape of a box with a bottom and surrounds the abovementioned block member 5c and the abovementioned screw rod 5b.

The upper part of screw rod 5b does not have a male thread formed thereon and, as shown in FIG. 1, passes vertically through the upper end lid 8b of cylindrical upper vacuum chamber 8 while being vacuum sealed and is connected to the rotating shaft of servo motor 5a.

With this arrangement, when screw rod 5b is rotated by means of servo motor 5a, block member 5c is raised or lowered by the feed screw mechanism while holding induction heating pipe 5.

At the lower part of the abovementioned induction heating pipe 5, the receiving container 6, which surrounds this lower part, receives and temporarily stores the melt resulting from the melting by the induction heating, and allows overflow of the melt from the upper end, is placed on a receiving container holder 7, which is supported on the lower end part of cylindrical upper vacuum chamber 8.

Receiving container 6 is arranged from a carbon material or graphite material, which is the same dielectric and conductive heat-resistant material as that of the abovementioned induction heating pipe 5, and is induction heated by induction heating coil 10 to heat further the melt that is temporarily stored in its interior to thereby increase the fluidity of the melt that overflows from the upper end and make the melt flow more readily as a thin liquid film. This heating also causes reduction of the residual metal oxides that could not be reduced completely inside the abovementioned induction heating pipe 5.

As shown in FIG. 1, receiving container 6 has a cylindrical shape and has a protruding part 6b provided at the inner bottom surface part directly below the abovementioned induction heating pipe 5. Besides the hemispherical shape shown in FIG. 1, the shape of protruding part 6 may be spherical, conical, truncated conical, pyramidal, or truncated pyramidal, as long as it is a shape with which a gap can be formed between the outer surface of protruding part 6b and the inner surface of the lower end part of induction heating pipe 5 or the inner edge of the lower end of induction heating pipe 5 and the cross-sectional area of this gap can be adjusted gradually and at high precision by the raising and lowering of induction heating pipe 5.

Figure 4:
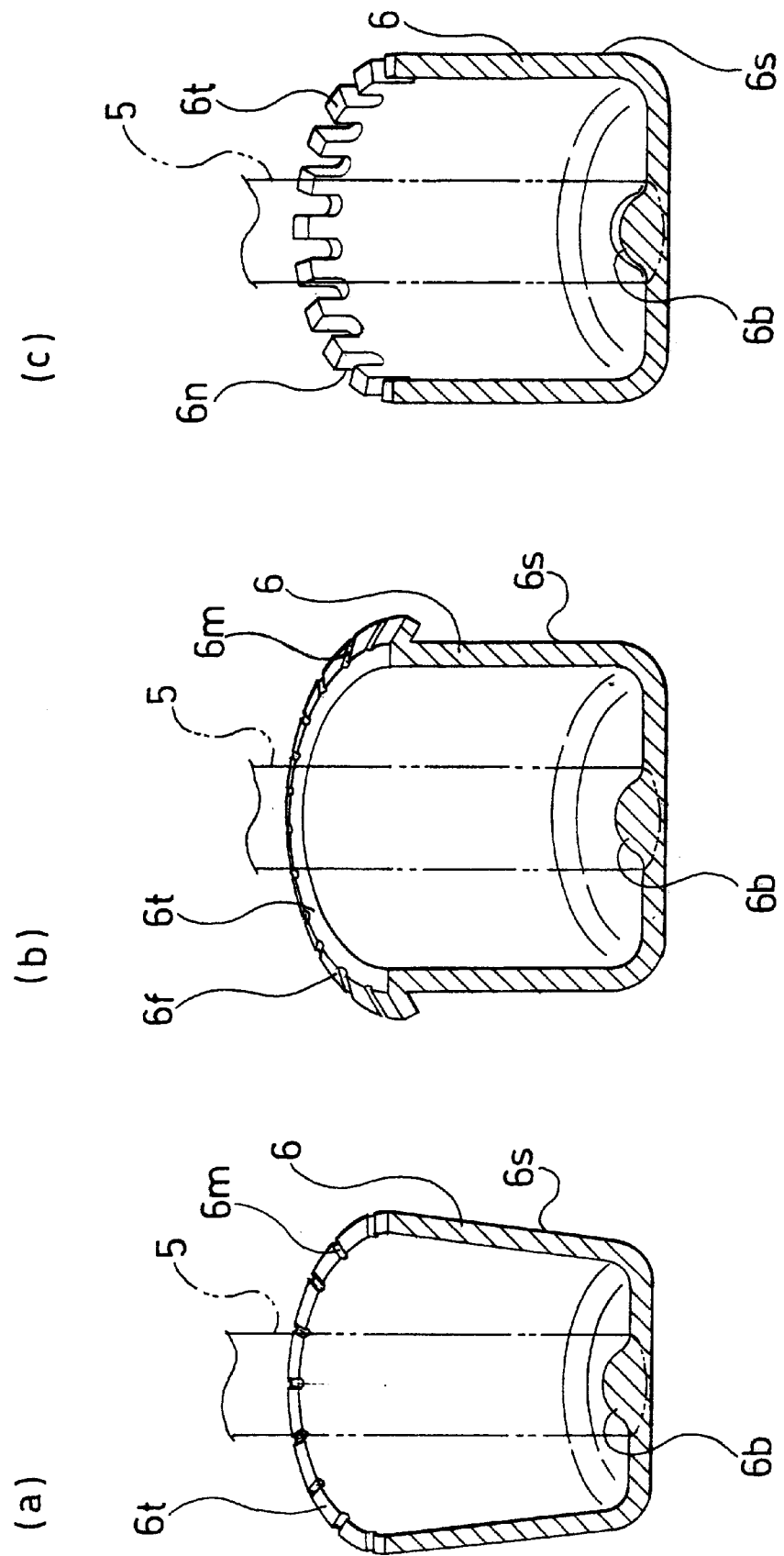
FIG. 4 is cutaway perspective views, which show three embodiments of the receiving container.

Preferable shapes of receiving container 6 include a shape, with which the longitudinal cross-sectional shape is an inverted trapezoid and grooves 6m are provided at the upper end thereof as shown in FIG. 4(a), a shape, with which a flange-like extension part 6f is provided at the upper end 6t of the side wall and grooves 6m are provided in this extension part 6f as shown in FIG. 4(b), and a shape, with which a plurality of notches 6n are provided at equal intervals along the circumference of the upper end 6t of the side wall as shown in FIG. 4(c).

When receiving container 6 is made to have a shape such as that shown in FIG. 4(a) or (b), since the melt that overflows from the upper end 6t of receiving container 6 will not trail along the outer surface 6s of the side wall of receiving container 6 but will flow down in the form of a liquid film that is separated from the side wall outer surface 6s, the effect of approximately doubling the area of contact (interfacial area) with the vacuum atmosphere and thereby approximately doubling the rate of vaporization of the metals will be provided. Also, by providing grooves 6m in the outer direction from the center of receiving container 6 at the upper end 6t of the side wall or at the flange-like extension part 6f of receiving container 6 and thereby varying the rate of overflow of the melt at each groove 6m, interruptions (openings) can be formed in parts of the liquid film of the melt that flows down like a waterfall from the abovementioned upper end 6t of the side wall so that the metal vapor will not be trapped in the space between the liquid film, which falls like a waterfall from the upper end of the sidewall of receiving container 6, and the outer surface of the side wall of receiving container 6 and be prevented from escaping to the exterior.

When a plurality of notches 6n are provided at the upper end as shown in FIG. 4(c), the flow rate of the melt that flows outward from the notches 6n will be increased in comparison to the case shown in FIG. 1 where there are no notches 6n, provided that the rate of overflow is the same in both cases. A flow that does not trail along outer surface 6s of the side wall of receiving container 6 and is separated from outer surface 6s of the side wall can thus be formed. As a result, the area of contact (interfacial area) with the vacuum atmosphere is increased, providing the effect of increasing the rate of vaporization of the metals. The shape of notches 6n may be square, inverted trapezoidal, semicircular, semielliptical, inverted triangular, etc. or any other shape as long as it is a shape with which the abovementioned actions and effects will be great.

Figure 5:
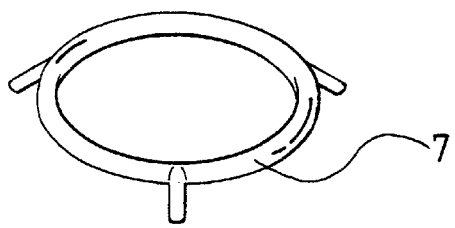
FIG. 5($a$) is a perspective view of the receiving container holder, FIG. 5($b$) is a cutaway perspective view of the tilting pan and the tilting mechanism therefor, and ($c$) is a perspective view of the melt storage tank and the carrying means therefor.
Figure 5:
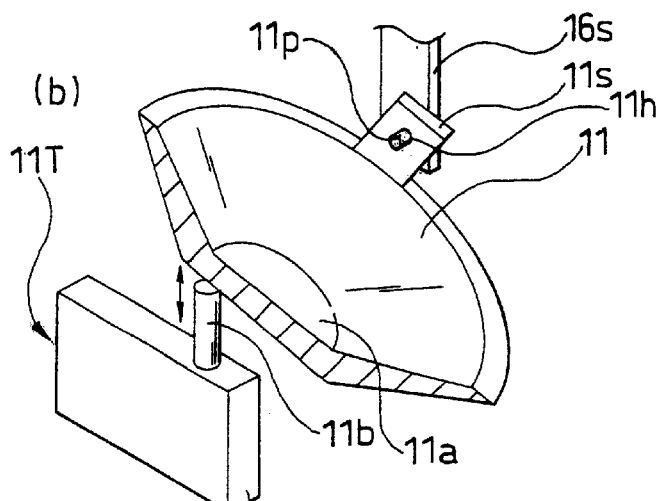
Figure 5:
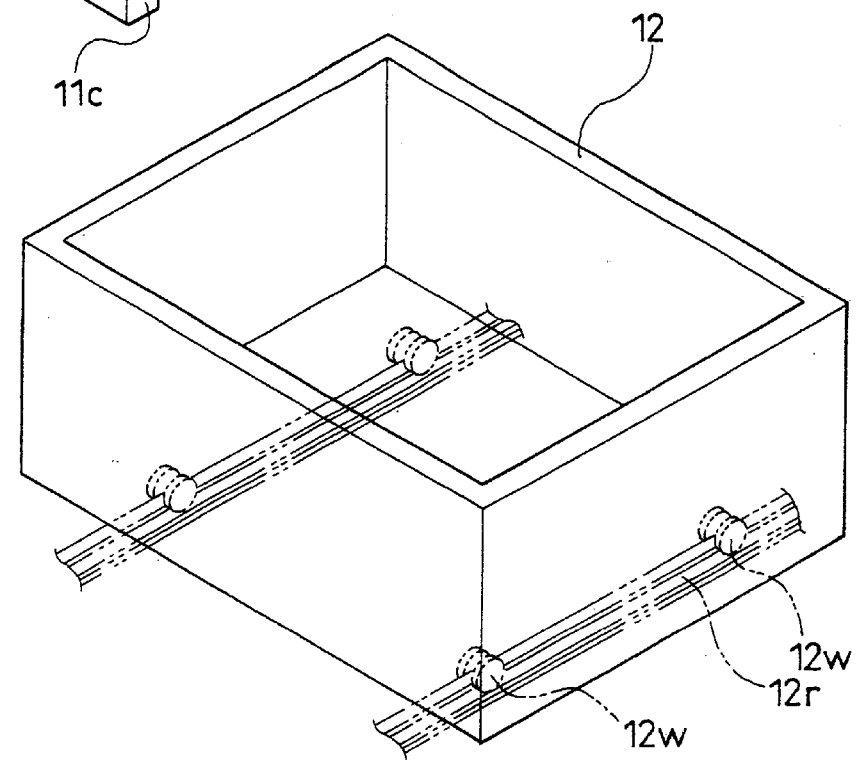

Though receiving container holder 7 may have the shape of a tripod as shown in FIGS. 1 and 5(a), it may be of any shape by which receiving container 6 can be held at the bottom part of cylindrical upper vacuum chamber 8. The shape, dimensions, and material of receiving container holder 7 are preferably those with which the mechanical and chemical erosion by the colliding melt that flows down from receiving container 6 can be withstood over long periods of time, the receiving container 6 can be supported horizontally with stability, and the melt that flows down will not readily collide and splash onto the surroundings.

Cylindrical upper vacuum chamber 8 is comprised of a cylindrical container, which encloses the lower half part of heat-resistant piping 3, the electric precipitation means 4, the induction heating pipe 5, the receiving container 6, and the receiving container holder 7, is opened at the lower end and connected to the lower vacuum chamber 16 to be described below, and is equipped with a lid 8b at the upper end. At positions of the outer peripheral surface of cylindrical upper vacuum chamber 8 that correspond to the positions of the above-described induction heating pipe 5 and receiving container 6 is disposed an induction heating coil 10. At the upper end of cylindrical upper vacuum chamber 8 is connected to an evacuation pipe 9, which is connected to an unillustrated vacuum pump.

A refractory material of good heat insulation characteristics, such as high alumina material or alumina-silica material that does not contain graphite, can be used as the material of cylindrical upper vacuum chamber 8.

Induction heating coil 10 is arranged by winding a copper pipe of high electrical conductivity into coil-like form and is cooled by passing cooling water through the interior of the copper pipe. The cross-sectional shape of induction heating coil 10 may be elliptical.

The specific arrangement and actions of melt storage and extraction part 1b shall now be described.

The melt storage and extraction part 1b, which is disposed adjacent the lower part of the above-described powder melting part 1a, has its interior enclosed in a lower vacuum chamber 16, which is partitioned into an upper chamber 16a and lower chamber 16b by a partition plate 16p disposed at the central part in the height direction.

Directly below the abovementioned receiving container 6 inside the upper chamber 16a is disposed a plate-like tilting pan 11, which is normally tilted by just a prescribed angle and is for receiving the melt that overflows and flows down from receiving container 6 and for making this melt flow down into the melt storage tank 12, disposed inside lower chamber 16b.

As shown in FIG. 5(b), at two locations on the diameter line of the upper end face of tilting pan 11 are vertically fixed a pair of hangers 11s, which are equipped with through holes 11h that pass through in the diameter direction, and tilting pan 11 is supported in a manner enabling tilting and natural recovery to the horizontal position by the engagement of the abovementioned through holes 11h with supporting pins 11p, which are fixed horizontally to the lower end parts of supporting members 16s that extend vertically from the roof of upper chamber 16a.

A tilting mechanism 11T is disposed at a position of the lower surface at the side end wall side of upper chamber 16a below the axial line that passes through the through holes 11h of the abovementioned pair of hangers 11s of bottom part 11a of tilting pan 11, and the head end of the vertically-driven piston rod 11b of cylinder 11c is disposed in a manner enabling contacting with and separating from the bottom part 11a of tilting pan 11. Thus by extending piston rod 11b and pushing up the lower surface of tilting pan 11 that comes in contact, tilting pan 11 can be tilted at a desired angle. On the other hand, tilting pan 11 is arranged, by the positional relationship of the center of gravity of tilting pan 11 with respect to the axial line that passes through the through holes 11h of the abovementioned pair of hangers 11s, to return naturally to the horizontal position when piston rod 11b is withdrawn, and tilting pan 11 thus returns to the horizontal position when the head end of piston rod 11b separates from the bottom surface of the lower part 1a of tilting pan 11.

During the exchanging of melt receiving tank 12 to be described below, tilting pan 11 is returned to the horizontal position to serve the role of temporarily storing the melt that overflows and flows down continuously from the above-described receiving container 6. Tilting pan 11 is therefore formed to have a volume that enables storage of the melt during this exchange process.

Melt storage tank 12 is for example a rectangular tank as shown in FIGS. 1 and 5(c), and has wheels 12w equipped at the bottom part. When a prescribed amount or more of the melt has accumulated in melt storage tank 12, melt storage tank 12 is carried out to the exterior of lower chamber 16b for post-treatment of the melt. For this purpose, a circular lid 13, which seals the abovementioned through hole 16ph of the partition plate 16p that partitions the upper chamber 16a and the lower chamber 16b to maintain the interiors of upper chamber 16a and cylindrical upper vacuum chamber 8 at vacuum, is mounted in a manner enabling opening and closing to the lower surface of the abovementioned partition plate 16p.

Also, as shown in FIG. 1, lower chamber 16b is provided with an opening/closing door (not shown), which is for moving in and out the above-described melt storage tank 12, a rail 12r, an atmospheric inlet pipe 14, which is equipped with an atmospheric inlet valve (for example, a needle valve) 14v for returning the pressure of lower chamber 16b to atmospheric pressure, an evacuation pipe 15, which is connected to an unillustrated vacuum pump for returning the interior of lower chamber 16b back to vacuum, etc.

Since the melt that has been stored in melt storage tank 12 has been removed of metals and is rendered harmless, it is carried out of lower chamber 16b, processed and treated into air granulated slag or water granulated slag and put to effective use as a soil improvement agent, roadbed material, concrete aggregate, raw material for water-permeable bricks, etc.

A first embodiment of this invention's method of induction-heat melting treatment of metal-oxide-containing powders, which makes use of the first embodiment of this invention's device for induction-heat melting treatment of metal-oxide-containing powders, arranged as described above, shall now be described with reference to the abovementioned drawings.

(1) Incineration ash, fly ash, or other powder, containing oxides of hazardous metals, is vacuum dried in advance and lowered in water content to 30% or less in order to facilitate the transfer work, etc.

(2) The abovementioned powder is transferred into and stored in the closed hopper 2.

(3) While controlling the flow rate by means of dampers (butterfly valves) 3a and 3b, the abovementioned powder is dropped from closed hopper 2 and via heat-resistant pipe 3 into induction heating pipe (made of carbon material) 5, which has been heated to a high temperature by induction heating coil 10. The mixed powder is heated mainly by the radiant heat from induction heating pipe 5 and is thereby melted while the metal oxides are reduced.

(4) The melt resulting from the melting process in induction heating pipe 5 is heated further while being temporarily stored in receiving container (made of carbon material) 6. The remaining unreduced metal oxides are reduced at the same time.

(5) Induction heating pipe 5 is raised and lowered by means of the raising/lowering drive mechanism 5A (feed screw mechanism), comprised of servo motor 5a, screw rod 5b, and block member 5c, having a female thread formed therein, to adjust the cross-sectional area of the gap between the outer surface of protruding part 6b at the inner bottom surface of receiving container 6 and the inner surface of the lower end part of induction heating pipe 5 so that while the melt is made to flow into receiving container 6 at an appropriate flow rate, the melt will be made to overflow from the upper end of receiving container 6 and the liquid-film-like melt that flows down will be exposed to the atmosphere in cylindrical upper vacuum chamber 8, which is evacuated to be of a prescribed degree of vacuum, to thereby cause the readily-vaporized metals in the melt to vaporize.

(6) The ascending evacuation flow, which contains the vaporized metals, is made to collide against the annular electrode plate 4b, disposed at the outer periphery of the upper endpart of induction heating pipe 5, to capture the metal vapor particles and/or condensed metal particles. The evacuation system is designed so that the rate of evacuation from the evacuation pipe 9 at the upper end of cylindrical upper vacuum chamber 8 will surpass the rate of evacuation from the evacuation pipe 15 of lower chamber 16 and the evacuation gas will form an ascending flow at portions above titling pan 11. By doing so, the metals, which have vaporized from the melt that overflows and flows down from receiving container 6, will be carried upwards by the ascending evacuation gas and will be collected and recovered by the above-described electric precipitation means 4.

(7) The melt, which has overflowed from receiving container 6 and has been rendered harmless by the vaporization of readily vaporized metals, is made to flow down, via the tilting pan 11 that has been tilted by just the prescribed angle, into the melt storage tank 12, disposed in lower chamber 16b of lower vacuum chamber 16, and is stored there until the prescribed amount of melt accumulates.

(8) When the prescribed amount of melt has accumulated in melt storage tank 12, tilting pan 11 is returned to the horizontal position, and while melt is being stored in tilting pan 11, the through hole 16ph of partition plate 16p of lower vacuum chamber 16 is closed by circular lid 13 to maintain the interiors of upper chamber 16a and cylindrical upper vacuum chamber 8 at vacuum and continue the induction-heat melting treatment of the powder.

(9) The evacuation via evacuation pipe 15 is stopped and the atmospheric inlet valve 14v is opened to introduce atmosphere into the interior of lower chamber 16 to return the interior to atmospheric pressure. The opening/closing door (not shown) is then opened to draw melt storage tank 12 out of the lower chamber and bring in a spare melt storage tank 12 into lower chamber 16b.

(10) The opening/closing door (not shown) and the atmospheric inlet valve 14v are closed and evacuation of the interior of lower chamber 16b is performed via evacuation pipe 15 to raise the degree of vacuum until the interior of lower chamber 16b becomes equal in pressure to the interiors of upper chamber 16a and cylindrical upper vacuum chamber 8.

(11) Circular lid 13 is opened and tilting pan 11 is tilted again to cause the melt to flow down into melt storage tank 12 and begin storage of the melt again. During the induction-heat melting treatment of the powder, evacuation is continued via the evacuation pipe 9 at the upper end of cylindrical upper vacuum chamber 8 and the evacuation pipe 15 of lower chamber 16 to maintain the interiors of cylindrical upper vacuum chamber 8 and lower vacuum chamber 16 at the prescribed degree of vacuum.

(12) When the prescribed amount of metals has been collected and accumulated at the annular electrode plate 4b of electric precipitation means 4, the operation of the device is stopped temporarily to exchange annular electrode plate 4b, and then the operation of the device is continued again. Electricity is passed through the annular electrode plate 4b that has been taken out and the accumulated metals are thereby melted and removed by resistive heating to regenerate annular electrode plate 4b. Since the metals obtained are low in impurities and high in purity, they are solidified as ingots and reused in applications that suit the composition.

(Method of Induction-Heat Melting Treatment of Metal-Oxide-Containing Powders and Device Therefor: First Aspect)

A second embodiment of this invention's device according to the first aspect for induction-heat melting treatment of metal-oxide-containing powders shall now be described with reference to the attached drawings.

Figure 6:
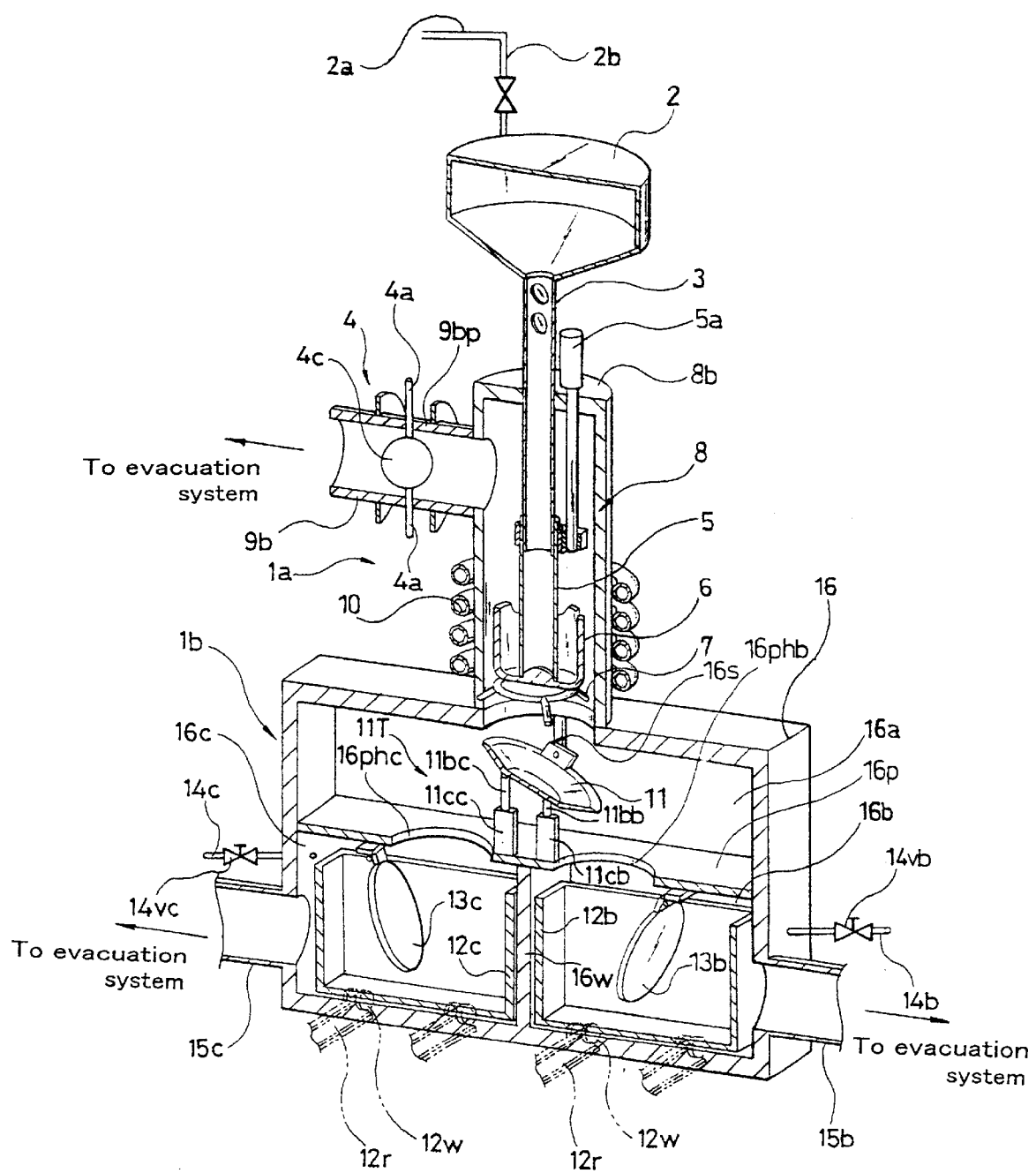
FIG. 6 is a cutaway perspective view, which shows the general arrangement of the entirety of a second embodiment of this invention's device for induction-heat melting treatment of metal-oxide-containing powders.

FIG. 6 is a cutaway sectional view, which shows the general arrangement of the entirety of the second embodiment of this invention's device for induction-heat melting treatment of metal-oxide-containing powders.

With the exception of the following points, this embodiment is the same in arrangement as the first embodiment, described above with reference to FIGS. 1 through 5.

(1) Electric precipitation means 4 is disposed inside an evacuation pipe 9b, which is connected to the upper side wall of cylindrical upper vacuum chamber 8, and is comprised of a disk electrode plate 4c, of an outer diameter that is smaller than the inner diameter of the abovementioned evacuation pipe 9b, and a pair of rod conductors 4a, which are connected at two locations in the diameter direction of disk electrode plate 4c and passes through the wall surface of evacuation pipe 9b while being vacuum sealed to supply electric current to the abovementioned disk electrode plate 4c. The connection part 9bp, which is of prescribed length and is disposed at the parts of the abovementioned evacuation pipe 9b at the front and rear of the setting position of the abovementioned vacuum precipitation means 4, is a flange connection and is detachably connected to the upstream and downstream parts of evacuation pipe 9b.

(2) Lower chamber 16 is equipped with a partition plate 16p, which partitions the interior of lower chamber 16 vertically into an upper chamber 16a, which encloses the above-described tilting pan 11, and the two left and right lower chambers 16b and 16c, which enclose the two left and right melt storage tanks 12b and 12c, respectively, a partition wall 16w, which partitions the abovementioned lower chamber into the two left and right lower chambers 16b and 16c, through holes 16phb and 16phc, which are provided in the abovementioned partition plate 16p and cause the melt to flow down respectively from the abovementioned tilting pan 11 into the melt storage tanks 12b and 12c, which are respectively enclosed in the abovementioned left and right lower chambers 16b and 16c, opening/closing lids 13b and 13c, which open and close the abovementioned through holes 16phb and 16phc, respectively, atmospheric inlet pipes 14b and 14c, which are connected to the abovementioned left and right lower chambers 16b and 16c, respectively, and are equipped with atmospheric inlet valves 14vb and 14vc, respectively, electrode plate 4c, disposed in evacuation pipe 9b, to capture the metal vapor particles and/or condensed metal particles. The evacuation system is designed so that the rate of evacuation from the evacuation pipe 9b at the side wall of cylindrical upper vacuum chamber 8 will surpass the rate of evacuation from the evacuation pipe 15b or 15c of lower chamber 16b or 16c and the evacuation gas will form an ascending flow at portions above titling pan 11. By doing so, the metals, which have vaporized from the melt that overflows and flows down from receiving container 6, will be carried upwards by the ascending evacuation gas and will be collected and recovered by the above-described electric precipitation means 4.

(7) The melt, which has overflowed from receiving container 6 and has been rendered harmless by the vaporization of readily vaporized metals, is made to flow down, via the tilting pan 11 that has been tilted by just the prescribed angle, into the melt storage tank 12b, disposed in lower chamber 16b of lower vacuum chamber 16, and is stored there until the prescribed amount of melt accumulates.

(8) When the prescribed amount of melt has accumulated in melt storage tank 12b, tilting pan 11 is returned to the horizontal position, and while melt is being stored in tilting pan 11, the through hole 16phb at the lower chamber 16b side of partition plate 16p of lower vacuum evacuation pipes 15b and 15c, which are connected to the abovementioned left and right lower chambers 16b and 16c, respectively, and opening/closing doors (not shown), which are for bringing the abovementioned melt storage tanks 12b and 12c in and out of the lower chambers 16b and 16c, respectively. The tilting mechanism 11T of tilting pan 11 is comprised of piston rods 11bb and 11bc, which are extended from and withdrawn into a corresponding pair of cylinders 11cb and 11cc, and tilting pan 11 is tilted to the left or right or returned to the horizontal position by the contraction of piston 11bb of one cylinder 11cb at the same time as the extension of the piston 11cb of the other cylinder 11cc or by the reverse operation.

With the above arrangement, the electric precipitation means 4, with which the prescribed amount of metals has deposited on disk electrode plate 4c, can be detached readily along with connection part 9bp from evacuation pipe 9b to enable the exchange of disk electrode plate 4 to be performed readily and in a short time.

Furthermore, since the lower chamber is partitioned into the two chambers of 16b and 16c to enable the setting of melt storage tanks 12b and 12c respectively in the two chambers and other components are also made accessory to the two chambers respectively, the melt from tilting pan 11 can be made to flow down and be stored in the melt storage tank of one of the lower chambers during the exchange of the melt storage tank of the other lower chamber. The exchange of the melt storage tank of the lower chamber can thus be performed while taking time and without fail, and there is no need to temporarily stop the operation of the device, etc. as may have been needed with the above-described first embodiment when in the process of temporary storage of melt in the tilting pan, which has been returned to the horizontal position during exchange of melt storage tank 12, the time taken to exchange melt storage tank 12 exceeds the time it takes for the amount of melt in tilting pan 11 to reach the storage capacity of tilting pan 11 and the melt overflows from tilting pan 11 and flows into the lower chamber or to temporarily stop operation in order to avoid such an accident.

A second embodiment of this invention's method of induction-heat melting treatment of metal-oxide-containing powders, which makes use of the second embodiment of this invention's device for induction-heat melting treatment of metal-oxide-containing powders, arranged as described above, shall now be described with reference to the abovementioned FIG. 6.

Since the procedures (1) to (5) are the same as the procedures (1) to (5) of the first embodiment described above, redundant descriptions shall be omitted.

(6) The ascending evacuation flow, which contains the vaporized metals, is made to collide against the disk chamber 16 is closed by circular lid 13b to maintain the interiors of upper chamber 16a and cylindrical upper vacuum chamber 8 at vacuum and continue the induction-heat melting treatment of the powder.

(9) The circular lid 13c of through hole 16phc at the lower chamber 16c side, which is evacuated in advance to be of the same degree of vacuum as the abovementioned upper chamber 16a by evacuation via evacuation pipe 15c, is opened and tilting pan 11 is tilted towards the lower chamber 16c side to cause the melt to flow down into and be stored in melt storage tank 12c.

(10) The evacuation of lower chamber 16b via evacuation pipe 15b is stopped and the atmospheric inlet valve 14vb is opened to introduce atmosphere into the interior of lower chamber 16b to thereby return the interior to atmospheric pressure. The opening/closing door (not shown) is then opened to draw melt storage tank 12b out of the lower chamber 16b and bring in a spare melt storage tank 12b into lower chamber 16b.

(11) Before the melt in the melt storage tank 12c in the other lower chamber 16c reaches the predetermined amount, the opening/closing door (not shown) and the atmospheric inlet valve 14vb are closed and evacuation of the interior of lower chamber 16b is performed via evacuation pipe 15b to raise the degree of vacuum until the interior of lower chamber 16b becomes equal in pressure to the interior of upper chamber 16a.

(12) When the prescribed amount of metals has been collected and accumulated at the disk electrode plate 4c of electric precipitation means 4, the operation of the device is stopped temporarily to exchange disk electrode plate 4c, along with the connection part 9bp of evacuation pipe 9b, and then the operation of the device is continued again. Electricity is passed through the disk electrode plate 4c that has been taken out and the accumulated metals are thereby melted and removed by resistive heating to regenerate disk electrode plate 4c. Since the metals obtained are low in impurities and high in purity, they are solidified as ingots and reused in applications that suit the composition.

Though embodiments of this invention have thus been described above, this invention is not limited by the above-described embodiments but also covers other embodiments within a scope that does not fall outside the gist of the arrangement.

For example, in consideration of convenience during actual operation of the device, cylindrical upper vacuum chamber 8 may be provided with an inspection hole for observation of the internal conditions, or various measuring devices may be attached to enable automatic control based on the measurement results.

Figure 7:
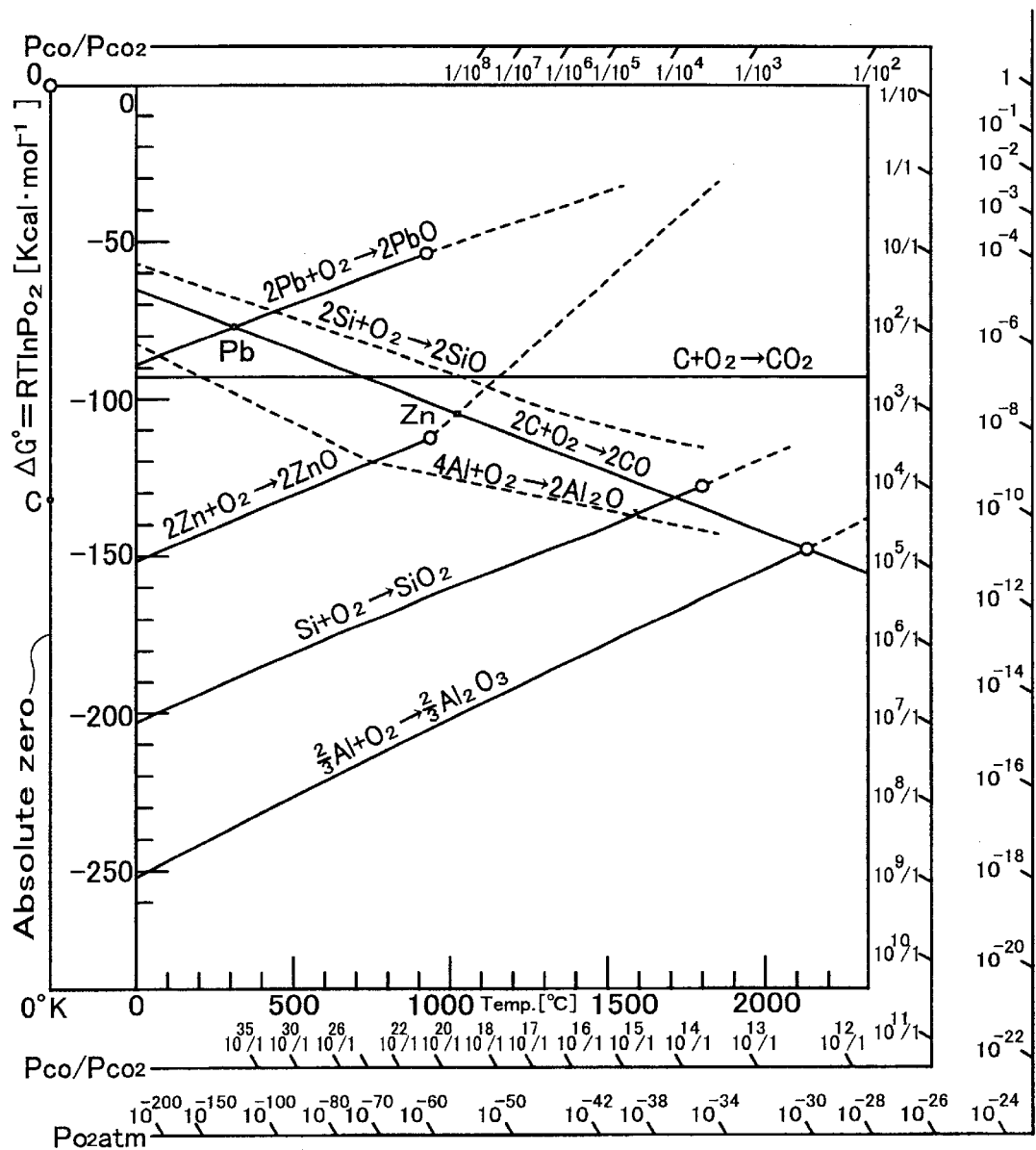
FIG. 7 is an explanatory diagram of the reaction temperatures of carbon reduction of some metal oxides.

Lastly, a description with reference to FIG. 7 shall be given concerning the reaction temperatures for reducing various metal oxides by carbon. Whereas in the case where metal oxides are to be vacuum reduced by performing resistive heating in vacuum using a high-melting point metal, such as molybdenum, etc., the reaction will take place at a high temperature of 1800° C. or more due to the high melting points of the metal oxides, when an induction heating pipe or receiving container formed from carbon material or graphite material is used and carbon reduction is performed by induction heating as in the present invention, the reduction reaction will proceed at a temperature of approximately 1000° C. or more even in the case of ZnO, which is the most difficult to reduce among the metal oxides. (Since the point at which the standard free energy line of $2C+O_2 \rightarrow 2CO$ intersects with the standard free energy line related to the generation reaction of each oxide is the reaction equilibrium point, the reaction equilibrium temperature will be at the point at which the vertical line drawn from the reaction equilibrium point intersects the temperature axis. Since the reaction of reduction of a metal oxide by carbon is an endothermic reaction, the reaction will proceed as long as the temperature is higher than the reaction equilibrium temperature.) This has been confirmed by experiments as well. Since the difficult-to-vaporize oxides of Pb and Zn in metal-oxide-containing powders can be removed favorably at a lower reaction temperature than the reaction temperature of vacuum reduction, the energy consumption can be made low. Also, at a temperature of 1600° C. or less, the oxides of Si and Al, which are often used as furnace materials, will not undergo carbon reduction.

(Second Aspect)

This invention's device for induction-heat melting treatment of metal-oxide-containing powders and the method for treating the same according to the second aspect of this invention shall now be described with reference to the attached drawings.

In this invention's device for induction-heat melting treatment of metal-oxide-containing powders according to the second aspect, the portion of the packing 60 in the invention's device for induction-heat melting. treatment of metal-oxide-containing powders according to the first aspect is improved. In the following descriptions, the same parts as in the first aspect represent the same symbols.

(Device for Induction-heat Melting Treatment)

As shown in FIG. 1, this invention's device 1 according to the second aspect for induction-heat melting treatment of metal-oxide-containing powders is largely comprised of a powder melting part la and a melt storage and extraction part 1b, similar to that of the first aspect.

The principal parts of powder melting part la are comprised of a transfer pipe 2a, which transfers a metal-oxide-containing powder that has been dried by an unillustrated vacuum drier, a rotary valve 2b, which is disposed in the middle of the abovementioned transfer pipe 2a, the abovementioned closed hopper 2, which is connected to the terminal end of the abovementioned transfer pipe 2a and with which the cross-section of the lower part that receives and stores the abovementioned metal-oxide-containing powder has the shape of an inverted cone, a heat-resistant piping 3, which is comprised of a ceramic material or a water-cooled double metal pipe, is connected to the lower end of the abovementioned closed hopper 2, and supplies the powder to induction heating pipe 5, an induction heating pipe 5, which is comprised of a dielectric material and the inner peripheral surface of the upper end part of which comes in contact with the outer peripheral surface of the abovementioned heat-resistant piping 3 in a manner enabling sliding in the vertical direction, a raising/lowering drive mechanism 5A, which supports the upper end part of the abovementioned induction heating pipe 5 in a manner enabling raising and lowering, a packing 60, which surrounds the lower part of the abovementioned induction heating pipe 5 and is comprised of a dielectric material that receives the melt of the abovementioned metal-oxide-containing powder that has been melted inside the abovementioned induction heating pipe 5, a cylindrical upper vacuum chamber 8, which encloses the lower part of the abovementioned heat-resistant piping 3, the abovementioned induction heating pipe 5, a part of the abovementioned raising/lowering drive mechanism 5A, and the packing 60 and with which an evacuation pipe 9 at the upper end thereof is connected to an unillustrated evacuation means, an induction heating coil 10, which is disposed so as to externally surround the positions of the abovementioned cylindrical upper vacuum chamber 8 corresponding to the abovementioned induction heating pipe 5, and an electric precipitation means 4, which is disposed above the abovementioned packing 60 inside the abovementioned cylindrical vacuum chamber 8 so as to externally surround the abovementioned induction heating pipe 5 and collects the metal vapor particles and/or condensed metal particles resulting from vaporization from the liquid-film-like melt that overflows and flows down from the abovementioned packing 60.

The principal parts of the melt storage and extraction part 1b are comprised of a tilting pan 11, which receives the melt that overflows and flows down from the abovementioned packing 60 and is supported in a manner enabling tilting and return to the horizontal position, a tilting mechanism 11T for the abovementioned tilting pan 11, a melt storage tank 12, which receives and stores the melt that flows down from the abovementioned tilting pan 11, and a lower vacuum chamber 16, which encloses the abovementioned tilting pan 11 and melt storage tank 12 and is connected to the lower end of the abovementioned cylindrical upper vacuum chamber 8.

The above-described embodiment furthermore has the following specific arrangements and exhibits the following actions.

Heat resistance and material strength are required of heat-resistant piping 3 since it receives much radiant heat from induction heating pipe 5 that is connected to its lower end part. A water-cooled double metal pipe or a ceramic pipe is therefore used.

In the interior of the upper part of heat-resistant piping 3 are axially pivoted two dampers (butterfly valves) 3a and 3b, which are comprised of ceramic material, water-cooled metal panels, or high-melting-point metal and are for the flow rate control of the powder. Dampers 3a and 3b are formed as disks of diameters that are slightly smaller than the inner diameter of heat-resistant piping 3, have their rotating shafts connected to unillustrated actuators at the exterior of heat-resistant piping 3, and are thereby rotated to perform flow rate control of the powder.

Also as shown in FIGS. 1 and 2, at the outer periphery of the lower end part of heat-resistant piping 3 and the upper end part of induction heating pipe 5 is provided the electric precipitation means 4, comprised of an annular electrode plate 4b, which is disposed so as to surround the abovementioned parts, and a pair of cylindrical rod conductors 4a, which support the abovementioned annular electrode plate 4b and supply power. Small gaps, through which the ascending stream of the various evacuated gases flow, are provided between the abovementioned annular electrode plate 4b and the outer peripheral surface of induction heating pipe 5 and the inner wall surface of cylindrical vacuum chamber 8, and the ascending evacuated gas stream collides with the abovementioned annular electrode plate to be collected of the metal vapor particles and/or the condensed metal particles and flows thereafter through the abovementioned gaps to the evacuation pipe 9 at the upper end of cylindrical vacuum chamber 8.

Induction heating pipe 5 is cylindrical and the inner peripheral surface thereof is made to contact the outer peripheral surface of the lower end part of the abovementioned heat-resistant piping 3 in a manner enabling sliding in the vertical direction. Carbon material or graphite material, which is good in dielectric characteristics and conductivity and can be heated rapidly by induction heating, is used for example as the material of induction heating pipe 5. As alternative materials to carbon material or graphite material, a high-melting-point metal, such as molybdenum, etc., or a dielectric ceramic material, etc. may also be used. In this case, it is preferable to perform induction heating upon separately adding a reducing agent, such as carbon material, etc., to the metal-oxide-containing powder since the reaction temperature can then be made lower.

As shown in FIG. 3, the raising/lowering drive mechanism 5A of induction heating pipe 5 is comprised of a clamp part 5d, which holds the outer peripheral surface of the upper end part of induction heating pipe 5, a block member 5c, which extends in the lateral direction perpendicular to the outer peripheral surface of the abovementioned clamp part 5d with one end thereof being fixed to a part of the abovementioned outer peripheral surface and is provided with a vertical through hole 5h having a female thread formed therein, a screw rod 5b, having a male thread formed thereon that engages with the female thread of the abovementioned vertical through hole 5h of the abovementioned block member 5c, a servo motor 5a, the rotating shaft of which is connected to the upper end of the abovementioned screw rod 5b, and a heat shielding case 5e, which has the shape of a box with a bottom and surrounds the abovementioned block member 5c and the abovementioned screw rod 5b.

The upper part of screw rod 5b does not have a male thread formed thereon and, as shown in FIG. 1, passes vertically through the upper end lid 8b of cylindrical upper vacuum chamber 8 while being vacuum sealed and is connected to the rotating shaft of servo motor 5a.

With this arrangement, when screw rod 5b is rotated by means of servo motor 5a, block member 5c is raised or lowered by the feed screw mechanism while holding induction heating pipe 5.

Figure 9:
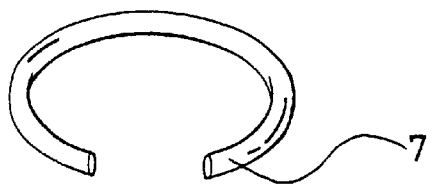
FIG. 9(a) is a perspective view of the packing holder.
FIG. 9(b) is a cutaway perspective view of the tilting pan and the tilting mechanism therefor, and (c) is a perspective view of the melt storage tank and the carrying means therefor.
Figure 9:
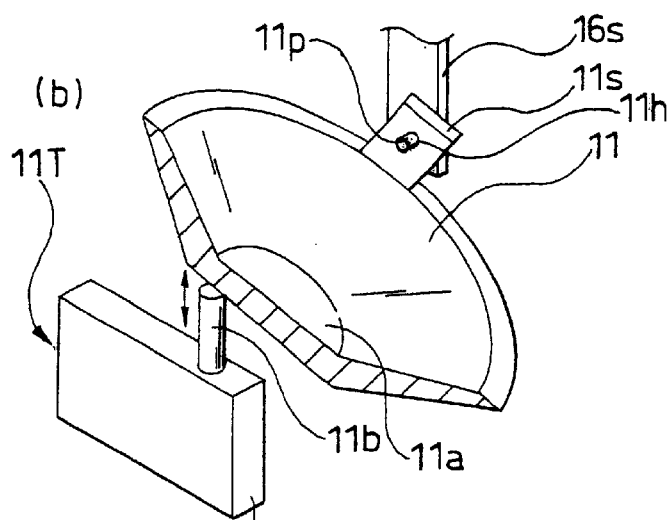
Figure 9:
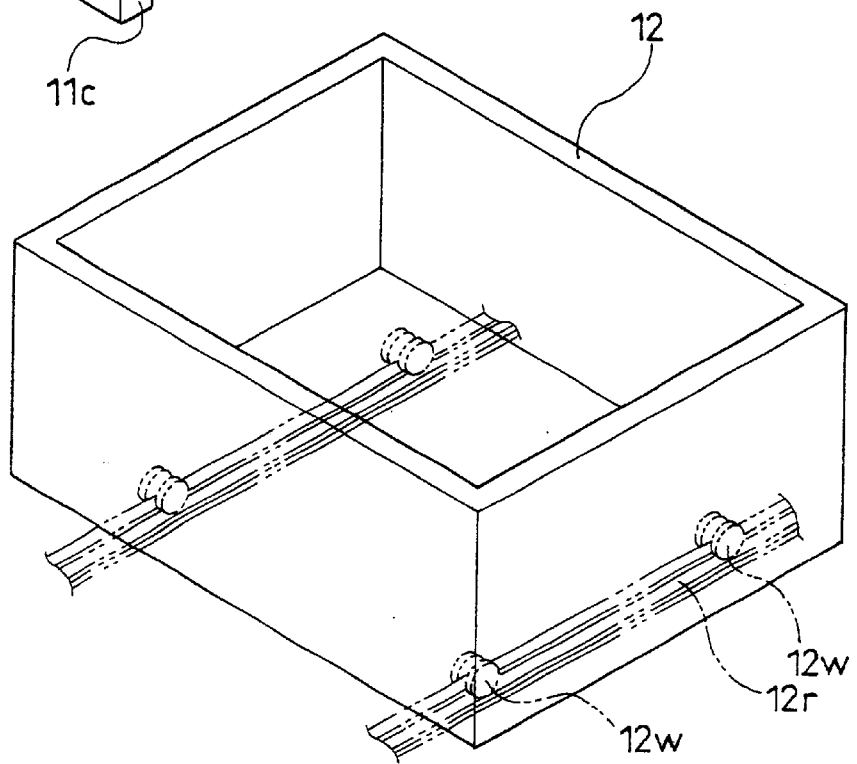

At the lower part of the abovementioned induction heating pipe 5, the packing 60, which surrounds this lower part, receives the melt resulting from the melting by the induction heating, and allows flow of the melt, is placed on a packing holder 7, which is supported on the lower end part of cylindrical upper vacuum chamber 8 (see FIG. 9(a)).

Packing 60 is arranged from a carbon material or graphite material, which is the same dielectric and conductive heat-resistant material as that of the abovementioned induction heating pipe 5, and is induction heated by induction heating coil 10 to heat further the melt flowing in its interior to thereby increase the fluidity of the melt that flows from the central circular pore 60p and make the melt flow on the slope s of the packing 60 more readily as a thin liquid film. This heating also causes reduction of the residual metal oxides that could not be reduced completely inside the abovementioned induction heating pipe 5.

As shown in FIG. 1, packing 60 has a cylindrical shape in which two cylindrical poles having the same diameter are piled up and has a protruding part 60p provided at the center of the cylinder directly below the abovementioned induction heating pipe 5. Besides the hemispherical shape shown in FIG. 1, the shape of protruding part 60p may be spherical, conical, truncated conical, pyramidal, or truncated pyramidal, as long as it is a shape with which a gap can be formed between the outer surface of protruding part 6b and the inner surface of the lower end part of induction heating pipe 5 or the inner edge of the lower end of induction heating pipe 5 and the cross-sectional area of this gap can be adjusted gradually and at high precision by the raising and lowering of induction heating pipe 5.

Figure 8:
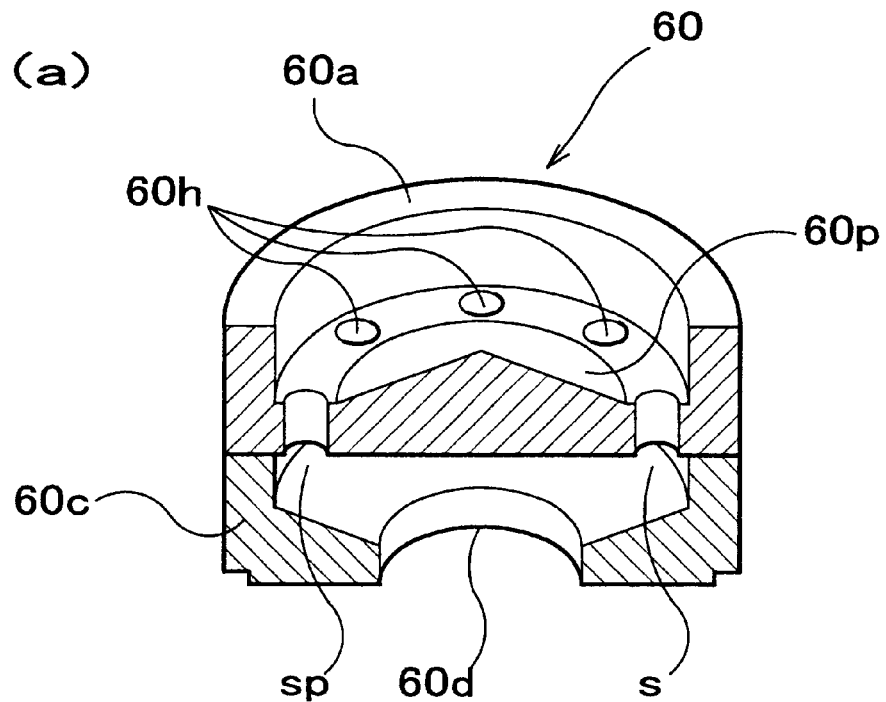
FIG. 8 is a cutaway perspective view, which shows the general arrangement of a prior-art device for induction-heat melting treatment of metal-oxide-containing powders.
Figure 8:
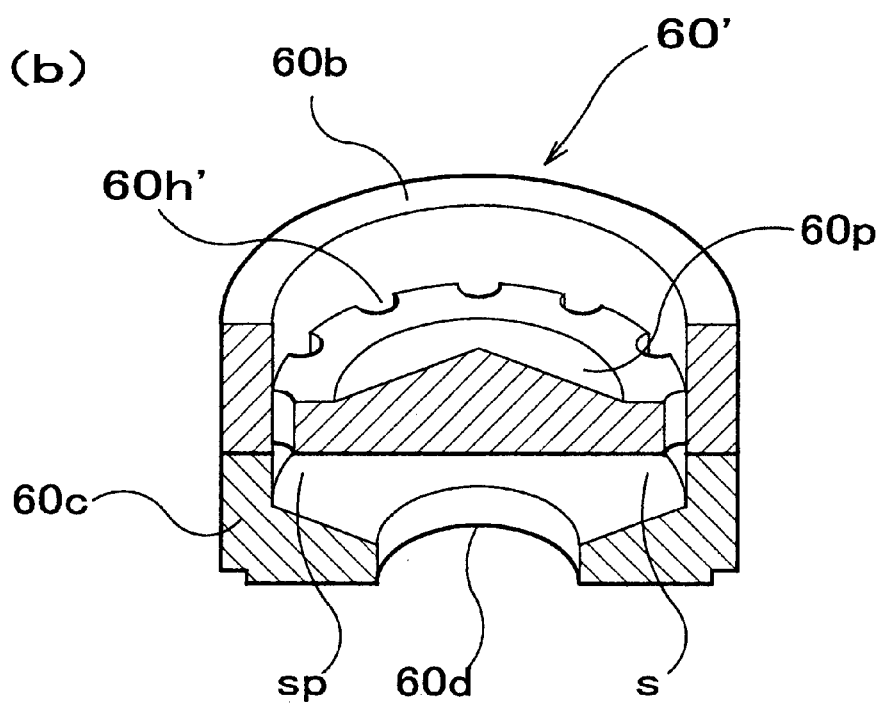

As shown in FIG. 8(a), packing 60 preferably has a shape composed of a circular cap 60a having a protruding part 60p at the center thereof, with a plurality of circular or semicircular pores 60h around the outer circumference thereof and a circular plate 60c having a circular pore 60d at the center thereof, and a downward slope s from the outer circumference to the center pore 60d, placed via a gap sp, and the packing 60 is desirably in contact with the lower inner wall of the cylindrical upper vacuum chamber 8. Optionally, packing 60 may be configured to be piled up with each other.

As shown in FIG. 8(b), circular pore 60h may have a plurality of semicircular pores 60h' around the outer circumference of protruding part 60p. It is also possible to combine circular pores 60h with semicircular pores 60h'.

When packing 60 is made to have a shape such as that shown in FIG. 8(a) or (b), the melt supplied to packing 60 from induction heating pipe 5 is formed into a liquid-film at protruding part 60p of circular cap 60a. While being heated, the melt is passed through circular pore 60h of circular cap 60a to reach circular plate 60c. Since the melt flows down to slope s of circular plate 60c in the liquid-film state, the area of contact (interfacial area) with the vacuum atmosphere becomes large, resulting in the enhanced rate of vaporization of the metals. When a plurality of packing 60 are piled up, the rate of vaporization of the metals can be further improved due to the addition of effects of mixing and stirring the melts from center to outside and from outside to the center.

Though packing holder 7 may have the shape of a tripod as shown in FIGS. 1 and 9(a), it may be of any shape by which packing 60 can be held at the bottom part of cylindrical upper vacuum chamber 8. The shape, dimensions, and material of packing holder 7 are preferably those with which the mechanical and chemical erosion by the colliding melt that flows down from packing 6 can be withstood over long periods of time, the packing 6 can be supported horizontally with stability, and the melt that flows down will not readily collide and splash onto the surroundings.

Cylindrical upper vacuum chamber 8 is comprised of a cylindrical container, which encloses the lower half part of heat-resistant piping 3, the electric precipitation means 4, the induction heating pipe 5, the packing 60, and the packing holder 7, is opened at the lower end and connected to the lower vacuum chamber 16 to be described below, and is equipped with a lid 8b at the upper end. At positions of the outer peripheral surface of cylindrical upper vacuum chamber 8 that correspond to the positions of the above-described induction heating pipe 5 and packing 60 is disposed an induction heating coil 10. At the upper end of cylindrical upper vacuum chamber 8 is connected to an evacuation pipe 9, which is connected to an unillustrated vacuum pump.

A refractory material of good heat insulation characteristics, such as high alumina material or alumina-silica material that does not contain graphite, can be used as the material of cylindrical upper vacuum chamber 8.

Induction heating coil 10 is arranged by winding a copper pipe of high electrical conductivity into coil-like form and is cooled by passing cooling water through the interior of the copper pipe. The cross-sectional shape of induction heating coil 10 may be elliptical.

The specific arrangement and actions of melt storage and extraction part 1b shall now be described.

The melt storage and extraction part 1b, which is disposed adjacent the lower part of the above-described powder melting part 1a, has its interior enclosed in a lower vacuum chamber 16, which is partitioned into an upper chamber 16a and lower chamber 16b by a partition plate 16p disposed at the central part in the height direction.

Directly below the abovementioned receiving container 6 inside the upper chamber 16a is disposed a plate-like tilting pan 11, which is normally tilted by just a prescribed angle and is for receiving the melt that overflows and flows down from receiving container 6 and for making this melt flow down into the melt storage tank 12, disposed inside lower chamber 16b.

As shown in FIG. 9(b), at two locations on the diameter line of the upper end face of tilting pan 11 are vertically fixed a pair of hangers 11s, which are equipped with through holes 11h that pass through in the diameter direction, and tilting pan 11 is supported in a manner enabling tilting and natural recovery to the horizontal position by the engagement of the abovementioned through holes 11h with supporting pins 11p, which are fixed horizontally to the lower end parts of supporting members 16s that extend vertically from the roof of upper chamber 16a.

A tilting mechanism 11T is disposed at a position of the lower surface at the side end wall side of upper chamber 16a below the axial line that passes through the through holes 11h of the abovementioned pair of hangers 11s of bottom part 11a of tilting pan 11, and the head end of the vertically-driven piston rod 11b of cylinder 11c is disposed in a manner enabling contacting with and separating from the bottom part 11a of tilting pan 11. Thus by extending piston rod 11b and pushing up the lower surface of tilting pan 11 that comes in contact, tilting pan 11 can be tilted at a desired angle. On the other hand, tilting pan 11 is arranged, by the positional relationship of the center of gravity of tilting pan 11 with respect to the axial line that passes through the through holes 11h of the abovementioned pair of hangers 11s, to return naturally to the horizontal position when piston rod 11b is withdrawn, and tilting pan 11 thus returns to the horizontal position when the head end of piston rod 11b separates from the bottom surface of the lower part 11a of tilting pan 11.

During the exchanging of melt receiving tank 12 to be described below, tilting pan 11 is returned to the horizontal position to serve the role of temporarily storing the melt that overflows and flows down continuously from the above-described receiving container 6. Tilting pan 11 is therefore formed to have a volume that enables storage of the melt during this exchange process.

Melt storage tank 12 is for example a rectangular tank as shown in FIGS. 1 and 9(c), and has wheels 12w equipped at the bottom part. When a prescribed amount or more of the melt has accumulated in melt storage tank 12, melt storage tank 12 is carried out to the exterior of lower chamber 16b for post-treatment of the melt. For this purpose, a circular lid 13, which seals the abovementioned through hole 16ph of the partition plate 16p that partitions the upper chamber 16a and the lower chamber 16b to maintain the interiors of upper chamber 16a and cylindrical upper vacuum chamber 8 at vacuum, is mounted in a manner enabling opening and closing to the lower surface of the abovementioned partition plate 16p.

Also, as shown in FIG. 1, lower chamber 16b is provided with an opening/closing door (not shown), which is for moving in and out the above-described melt storage tank 12, a rail 12r, an atmospheric inlet pipe 14, which is equipped with an atmospheric inlet valve (for example, a needle valve) 14v for returning the pressure of lower chamber 16b to atmospheric pressure, an evacuation pipe 15, which is connected to an unillustrated vacuum pump for returning the interior of lower chamber 16b back to vacuum, etc.

Since the melt that has been stored in melt storage tank 12 has been removed of metals and is rendered harmless, it is carried out of lower chamber 16b, processed and treated into air granulated slag or water granulated slag and put to effective use as a soil improvement agent, roadbed material, concrete aggregate, raw material for water-permeable bricks, etc.

A first embodiment of this invention's method of induction-heat melting treatment of metal-oxide-containing powders, which makes use of the first embodiment of this invention's device for induction-heat melting treatment of metal-oxide-containing powders, arranged as described above, shall now be described with reference to the above-mentioned drawings.

(13) Incineration ash, fly ash, or other powder, containing oxides of hazardous metals, is vacuum dried in advance and lowered in water content to 30% or less in order to facilitate the transfer work, etc.

(14) The abovementioned powder is transferred into and stored in the closed hopper 2.

(15) While controlling the flow rate by means of dampers (butterfly valves) 3a and 3b, the abovementioned powder is dropped from closed hopper 2 and via heat-resistant pipe 3 into induction heating pipe (made of carbon material) 5, which has been heated to a high temperature by induction heating coil 10. The mixed powder is heated mainly by the radiant heat from induction heating pipe 5 and is thereby melted while the metal oxides are reduced.

(16) The melt resulting from the melting process in induction heating pipe 5 is heated further while being passed through packing 60. The remaining unreduced metal oxides are reduced at the same time.

(17) Induction heating pipe 5 is raised and lowered by means of the raising/lowering drive mechanism 5A (feed screw mechanism), comprised of servo motor 5a, screw rod 5b, and block member 5c, having a female thread formed therein, to adjust the cross-sectional area of the gap between the outer surface of protruding part 60p at the center of circular cap 60a of packing 60 and the inner surface of the lower end part of induction heating pipe 5 so that while the melt is made to flow into packing 60 at an appropriate flow rate, the melt will be made to flow from circular pore 60d at the center of circular plate 60c and the liquid-film-like melt that flows down will be exposed to the atmosphere in cylindrical upper vacuum chamber 8, which is evacuated to be of a prescribed degree of vacuum, to thereby cause the readily-vaporized metals in the melt to vaporize.

(18) The ascending evacuation flow, which contains the vaporized metals, is made to collide against the annular electrode plate 4b, disposed at the outer periphery of the upper end part of induction heating pipe 5, to capture the metal vapor particles and/or condensed metal particles. The evacuation system is designed so that the rate of evacuation from the evacuation pipe 9 at the upper end of cylindrical upper vacuum chamber 8 will surpass the rate of evacuation from the evacuation pipe 15 of lower chamber 16 and the evacuation gas will form an ascending flow at portions above titling pan 11. By doing so, the metals, which have vaporized from the melt that flows down from packing 60, will be carried upwards by the ascending evacuation gas and will be collected and recovered by the above-described electric precipitation means 4.

(19) The melt, which has flowed from packing 60 and has been rendered harmless by the vaporization of readily vaporized metals, is made to flow down, via the tilting pan 11 that has been tilted by just the prescribed angle, into the melt storage tank 12, disposed in lower chamber 16*b* of lower vacuum chamber 16, and is stored there until the prescribed amount of melt accumulates.

(20) When the prescribed amount of melt has accumulated in melt storage tank 12, tilting pan 11 is returned to the horizontal position, and while melt is being stored in tilting pan 11, the through hole 16*ph* of partition plate 16*p* of lower vacuum chamber 16 is closed by circular lid 13 to maintain the interiors of upper chamber 16*a* and cylindrical upper vacuum chamber 8 at vacuum and continue the induction-heat melting treatment of the powder.

(21) The evacuation via evacuation pipe 15 is stopped and the atmospheric inlet valve 14*v* is opened to introduce atmosphere into the interior of lower chamber 16 to return the interior to atmospheric pressure. The opening/closing door (not shown) is then opened to draw melt storage tank 12 out of the lower chamber and bring in a spare melt storage tank 12 into lower chamber 16*b*.

(22) The opening/closing door (not shown) and the atmospheric inlet valve 14*v* are closed and evacuation of the interior of lower chamber 16*b* is performed via evacuation pipe 15 to raise the degree of vacuum until the interior of lower chamber 16*b* becomes equal in pressure to the interiors of upper chamber 16*a* and cylindrical upper vacuum chamber 8.

(23) Circular lid 13 is opened and tilting pan 11 is tilted again to cause the melt to flow down into melt storage tank 12 and begin storage of the melt again. During the induction-heat melting treatment of the powder, evacuation is continued via the evacuation pipe 9 at the upper end of cylindrical upper vacuum chamber 8 and the evacuation pipe 15 of lower chamber 16 to maintain the interiors of cylindrical upper vacuum chamber 8 and lower vacuum chamber 16 at the prescribed degree of vacuum.

(24) When the prescribed amount of metals has been collected and accumulated at the annular electrode plate 4*b* of electric precipitation means 4, the operation of the device is stopped temporarily to exchange annular electrode plate 4*b*, and then the operation of the device is continued again. Electricity is passed through the annular electrode plate 4*b* that has been taken out and the accumulated metals are thereby melted and removed by resistive heating to regenerate annular electrode plate 4*b*. Since the metals obtained are low in impurities and high in purity, they are solidified as ingots and reused in applications that suit the composition.

A second embodiment of this invention's device according to the second aspect for induction-heat melting treatment of metal-oxide-containing powders shall now be described with reference to the attached drawings.

Figure 10:
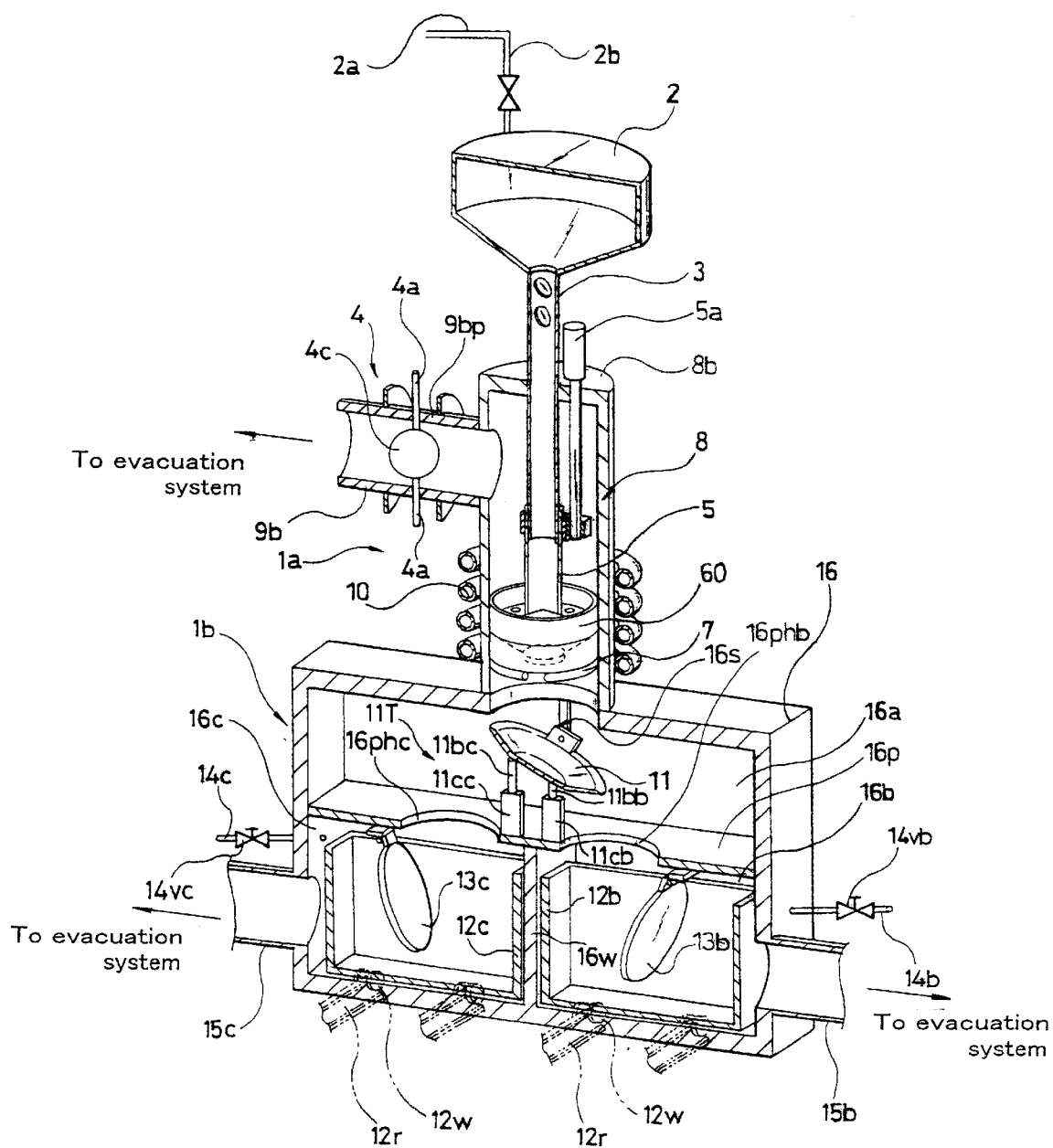
FIG. 10 is a cutaway perspective view, which shows the general arrangement of the entirety of the first embodiment of this invention's device according to the first aspect for induction-heat melting treatment of metal-oxide-containing powders.

FIG. 10 is a cutaway sectional view, which shows the general arrangement of the entirety of the second embodiment of this invention's device for induction-heat melting treatment of metal-oxide-containing powders.

With the exception of the following points, this embodiment is the same in arrangement as the first embodiment, described above with reference to FIGS. 1 through 9.

(3) Electric precipitation means 4 is disposed inside an evacuation pipe 9*b*, which is connected to the upper side wall of cylindrical upper vacuum chamber 8, and is comprised of a disk electrode plate 4*c*, of an outer diameter that is smaller than the inner diameter of the abovementioned evacuation pipe 9*b*, and a pair of rod conductors 4*a*, which are connected at two locations in the diameter direction of disk electrode plate 4*c* and passes through the wall surface of evacuation pipe 9*b* while being vacuum sealed to supply electric current to the abovementioned disk electrode plate 4*c*. The connection part 9*bp*, which is of prescribed length and is disposed at the parts of the abovementioned evacuation pipe 9*b* at the front and rear of the setting position of the abovementioned vacuum precipitation means 4, is a flange connection and is detachably connected to the upstream and downstream parts of evacuation pipe 9*b*.

(4) Lower chamber 16 is equipped with a partition plate 16*p*, which partitions the interior of lower chamber 16 vertically into an upper chamber 16*a*, which encloses the above-described tilting pan 11, and the two left and right lower chambers 16*b* and 16*c*, which enclose the two left and right melt storage tanks 12*b* and 12*c*, respectively, a partition wall 16*w*, which partitions the abovementioned lower chamber into the two left and right lower chambers 16*b* and 16*c*, through holes 16*phb* and 16*phc*, which are provided in the abovementioned partition plate 16*p* and cause the melt to flow down respectively from the abovementioned tilting pan 11 into the melt storage tanks 12*b* and 12*c*, which are respectively enclosed in the abovementioned left and right lower chambers 16*b* and 16*c*, opening/closing lids 13*b* and 13*c*, which open and close the abovementioned through holes 16*phb* and 16*phc*, respectively, atmospheric inlet pipes 14*b* and 14*c*, which are connected to the abovementioned left and right lower chambers 16*b* and 16*c*, respectively, and are equipped with atmospheric inlet valves 14*vb* and 14*vc*, respectively, evacuation pipes 15*b* and 15*c*, which are connected to the abovementioned left and right lower chambers 16*b* and 16*c*, respectively, and opening/closing doors (not shown), which are for bringing the abovementioned melt storage tanks 12*b* and 12*c* in and out of the lower chambers 16*b* and 16*c*, respectively. The tilting mechanism 11T of tilting pan 11 is comprised of piston rods 11*bb* and 11*bc*, which are extended from and withdrawn into a corresponding pair of cylinders 11*cb* and 11*cc*, and tilting pan 11 is tilted to the left or right or returned to the horizontal position by the contraction of piston 11*bb* of one cylinder 11*cb* at the same time as the extension of the piston 11*cb* of the other cylinder 11*cc* or by the reverse operation.

With the above arrangement, the electric precipitation means 4, with which the prescribed amount of metals has deposited on disk electrode plate 4*c*, can be detached readily along with connection part 9*bp* from evacuation pipe 9*b* to enable the exchange of disk electrode plate 4 to be performed readily and in a short time.

Furthermore, since the lower chamber is partitioned into the two chambers of 16*b* and 16*c* to enable the setting of melt storage tanks 12b and 12c respectively in the two chambers and other components are also made accessory to the two chambers respectively, the melt from tilting pan 11 can be made to flow down and be stored in the melt storage tank of one of the lower chambers during the exchange of the melt storage tank of the other lower chamber. The exchange of the melt storage tank of the lower chamber can thus be performed while taking time and without fail, and there is no need to temporarily stop the operation of the device, etc. as may have been needed with the above-described first embodiment when in the process of temporary storage of melt in the tilting pan, which has been returned to the horizontal position during exchange of melt storage tank 12, the time taken to exchange melt storage tank 12 exceeds the time it takes for the amount of melt in tilting pan 11 to reach the storage capacity of tilting pan 11 and the melt overflows from tilting pan 11 and flows into the lower chamber or to temporarily stop operation in order to avoid such an accident.

A second embodiment of this invention's method of induction-heat melting treatment of metal-oxide-containing powders according to the second aspect, which makes use of the second embodiment of this invention's device for induction-heat melting treatment of metal-oxide-containing powders, arranged as described above, shall now be described with reference to the abovementioned FIG. 10.

Since the procedures (1) to (5) are the same as the procedures (1) to (5) of the first embodiment described above, redundant descriptions shall be omitted.

(13) The ascending evacuation flow, which contains the vaporized metals, is made to collide against the disk electrode plate 4c, disposed in evacuation pipe 9b, to capture the metal vapor particles and/or condensed metal particles. The evacuation system is designed so that the rate of evacuation from the evacuation pipe 9b at the side wall of cylindrical upper vacuum chamber 8 will surpass the rate of evacuation from the evacuation pipe 15b or 15c of lower chamber 16b or 16c and the evacuation gas will form an ascending flow at portions above titling pan 11. By doing so, the metals, which have vaporized from the melt that overflows and flows down from packing 60, will be carried upwards by the ascending evacuation gas and will be collected and recovered by the above-described electric precipitation means 4.

(14) The melt, which has overflowed from packing 60 and has been rendered harmless by the vaporization of readily vaporized metals, is made to flow down, via the tilting pan 11 that has been tilted by just the prescribed angle, into the melt storage tank 12b, disposed in lower chamber 16b of lower vacuum chamber 16, and is stored there until the prescribed amount of melt accumulates.

(15) When the prescribed amount of melt has accumulated in melt storage tank 12b, tilting pan 11 is returned to the horizontal position, and while melt is being stored in tilting pan 11, the through hole 16phb at the lower chamber 16b side of partition plate 16p of lower vacuum chamber 16 is closed by circular lid 13b to maintain the interiors of upper chamber 16a and cylindrical upper vacuum chamber 8 at vacuum and continue the induction-heat melting treatment of the powder.

(16) The circular lid 13c of through hole 16phc at the lower chamber 16c side, which is evacuated in advance to be of the same degree of vacuum as the abovementioned upper chamber 16a by evacuation via evacuation pipe 15c, is opened and tilting pan 11 is tilted towards the lower chamber 16c side to cause the melt to flow down into and be stored in melt storage tank 12c.

(17) The evacuation of lower chamber 16b via evacuation pipe 15b is stopped and the atmospheric inlet valve 14vb is opened to introduce atmosphere into the interior of lower chamber 16b to thereby return the interior to atmospheric pressure. The opening/closing door (not shown) is then opened to draw melt storage tank 12b out of the lower chamber 16b and bring in a spare melt storage tank 12b into lower chamber 16b.

(18) Before the melt in the melt storage tank 12c in the other lower chamber 16c reaches the predetermined amount, the opening/closing door (not shown) and the atmospheric inlet valve 14vb are closed and evacuation of the interior of lower chamber 16b is performed via evacuation pipe 15b to raise the degree of vacuum until the interior of lower chamber 16b becomes equal in pressure to the interior of upper chamber 16a.

(19) When the prescribed amount of metals has been collected and accumulated at the disk electrode plate 4c of electric precipitation means 4, the operation of the device is stopped temporarily to exchange disk electrode plate 4c, along with the connection part 9bp of evacuation pipe 9b, and then the operation of the device is continued again. Electricity is passed through the disk electrode plate 4c that has been taken out and the accumulated metals are thereby melted and removed by resistive heating to regenerate disk electrode plate 4c. Since the metals obtained are low in impurities and high in purity, they are solidified as ingots and reused in applications that suit the composition.

Though embodiments of this invention have thus been described above, this invention is not limited by the above-described embodiments but also covers other embodiments within a scope that does not fall outside the gist of the arrangement.

For example, in consideration of convenience during actual operation of the device, cylindrical upper vacuum chamber 8 may be provided with an inspection hole for observation of the internal conditions, or various measuring devices may be attached to enable automatic control based on the measurement results.

A device for induction-heat melting treatment according to another embodiment will now be described by referring to FIGS. 11 and 12.

Since only a difference between the device according to the first aspect and the device according to this embodiment is packing which passes the melt from the induction heating pipe, the constructions, functions, and effects thereof will be described. The same parts have the same symbols as in the first embodiment.

A packing 60' used in the device for induction-heat melting treatment according to another embodiment is composed of a plurality of packing materials 60'a, and a packing support 60'b.

Packing support 60'b has a big funnel structure, and the upper end thereof is fixed onto the lower interior of cylindrical upper vacuum chamber 8.

Packing support 60'b is composed of g or a high-melting point metal (such as molybdenum), which is high in dielectric characteristics and electrical conductivity. It may also be composed of a dielectric ceramic.

The material making up packing support 60'b may be any material having a construction can support weight of the plurality of packing materials 60'a, and which allows for the melt flowing down (discharging the melt) at the bottom thereof.

Such a construction makes it possible to convert the melt into the liquid-film form at the surface of packing materials 60'a, enhancing the area of contact (interfacial area) with the vacuum atmosphere and, thus, and thereby the rate of vaporization of the metals can be accelerated.

Figure 11:
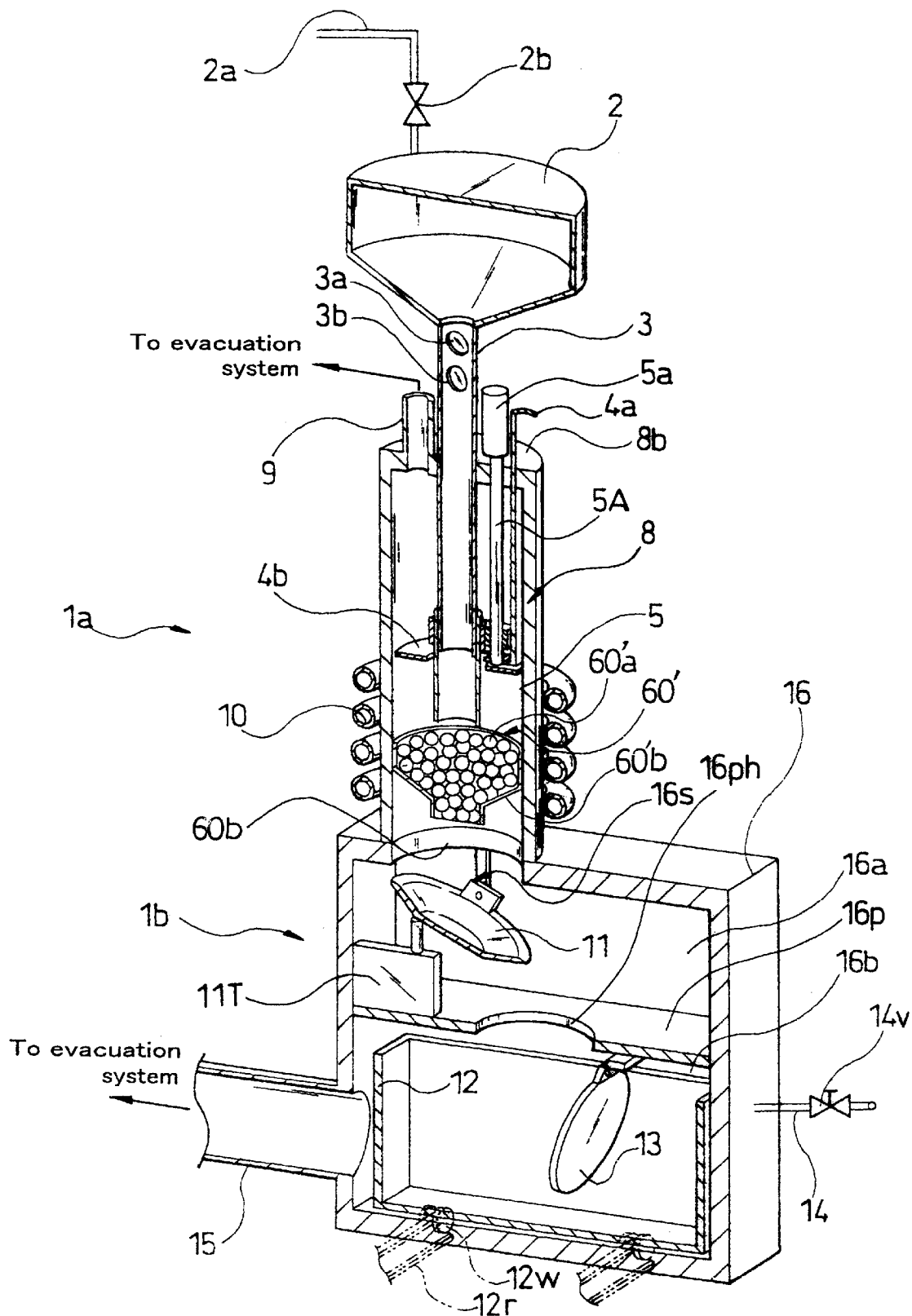
FIG. 11 is a cutaway perspective view, which shows the general arrangement of the entirety of the second embodiment of this invention's device according to the second aspect for induction-heat melting treatment of metal-oxide-containing powders.
Figure 12:
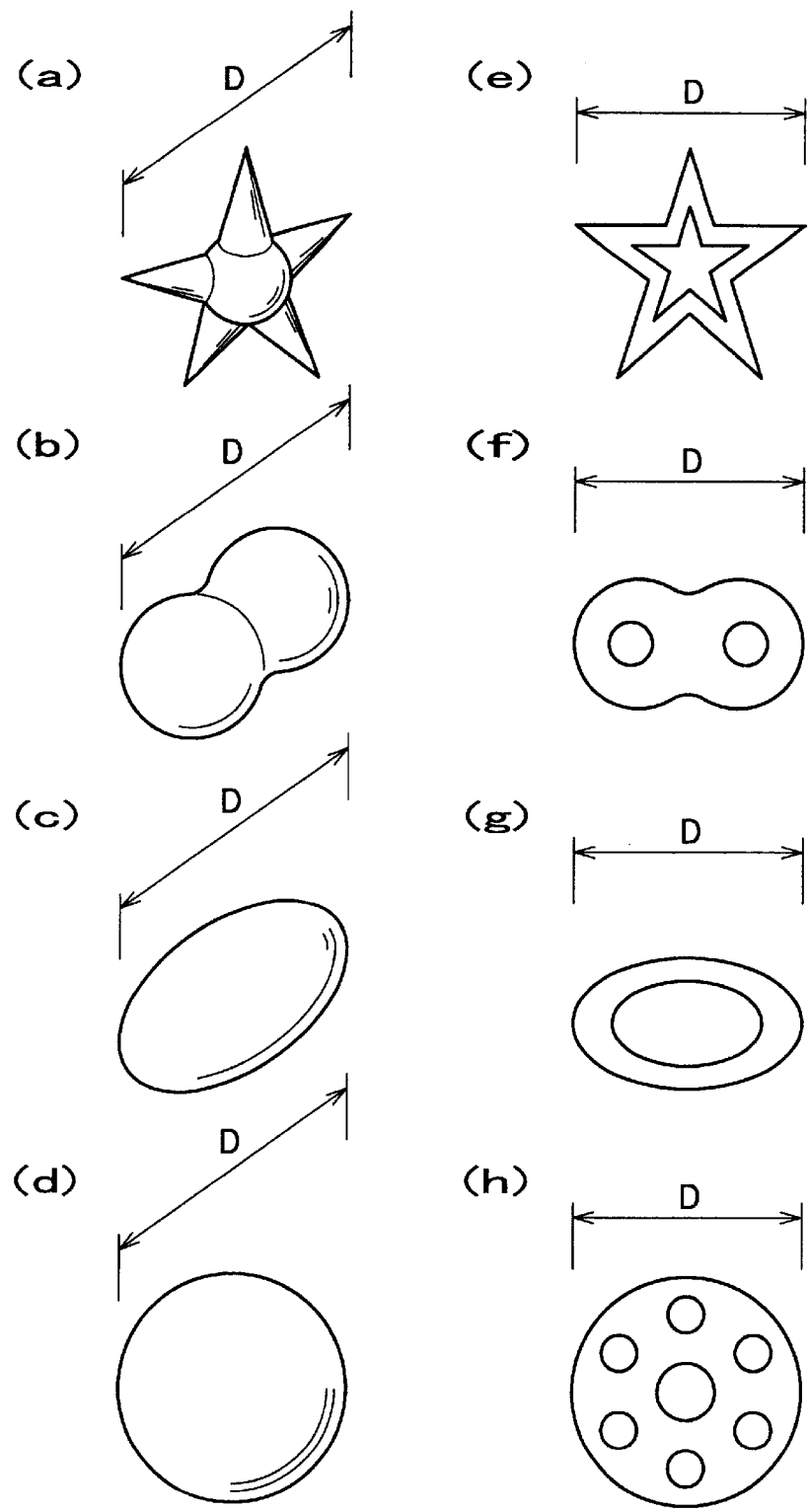
FIGS. 12(a) to (h) each shows the packing used in the general arrangement of the entirety of the second embodiment of this invention's device according to the first aspect.
Figure 13:
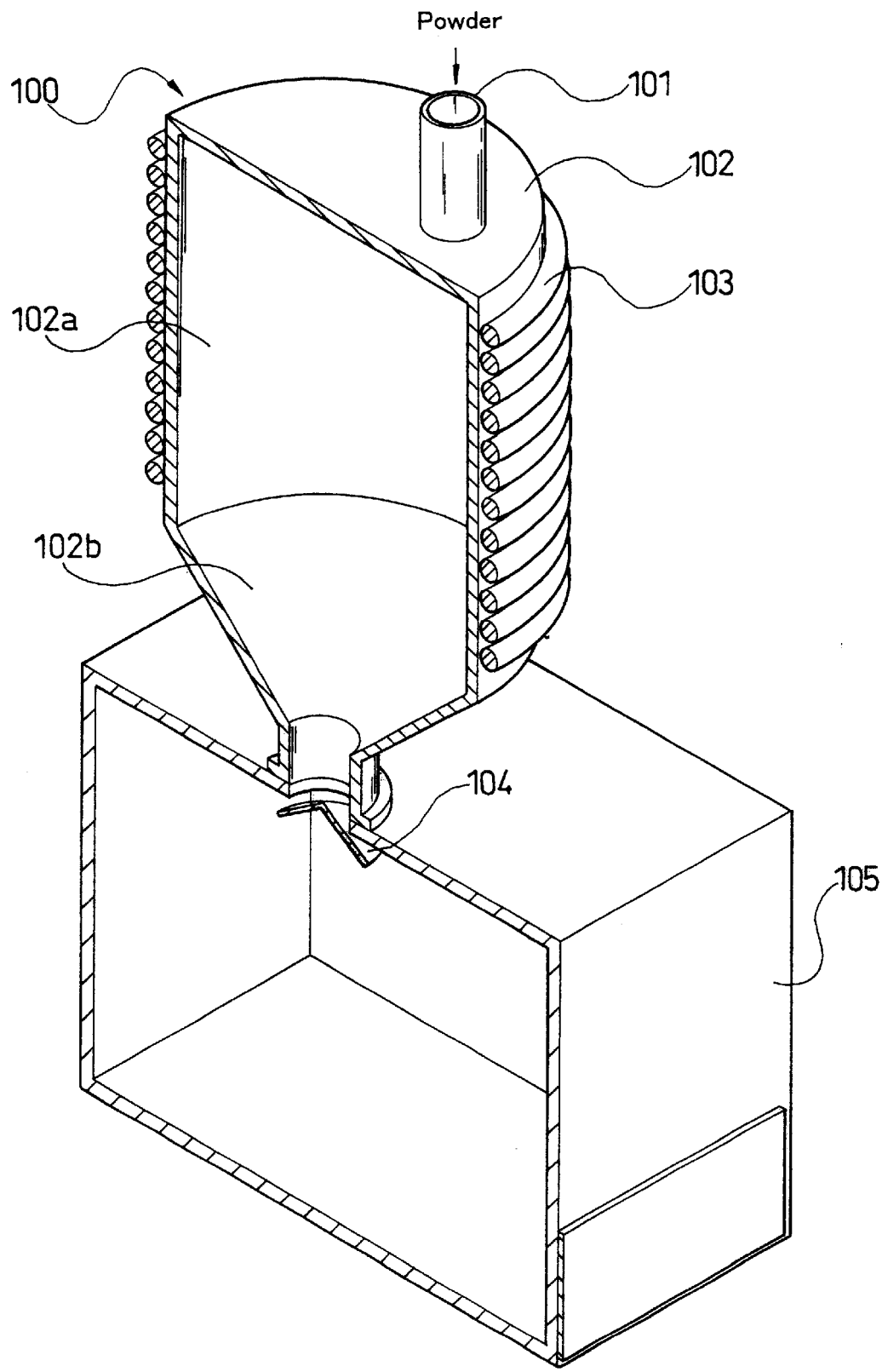
FIG. 13 is a cutaway perspective view, which shows the general arrangement of the entirety of the conventional device according to the first aspect for induction-heat melting treatment of metal-oxide-containing powders.

Packing material 60'a shown in FIG. 11 is a sphere. However, the sphere from is not suitable for converting the melt into the liquid-film due to the shortest circumference Aratio respect to the cross-section. As a result of our serious studies, we have discovered suitable material for converting the melt into the liquid-film. This is explained by referring to FIG. 12. The packing material has a shape in which the outer circumference of the sphere having a typical diameter D (basic diameter) is deformed toward the central side.

FIG. 12(a) shows a packing material in which five angles are projected from the center to the outsides. Since plurality of such packing materials are packed in packing support 60'b, space velocity formed by the materials becomes larger than the case of packing the polygonal material near sphere, the pressure loss in the course of passing the melt through packing 60' can be reduced.

FIG. 12(a) shows a packing material having a gourd form in which the sphere is deformed from the both ends to the center. Since plurality of such packing materials are packed in packing support 60'b, space velocity formed by the materials becomes larger than the case of packing the polygonal material near sphere, the pressure loss in the course of passing the melt through packing 60' can be reduced.

FIG. 12(c) shows an oval from packing material. Since plurality of such packing materials are packed in packing support 60'b, space velocity formed by the materials becomes larger than the case of packing the polygonal material near sphere, the pressure loss in the course of passing the melt through packing 60' can be reduced.

FIG. 12(d) shows a spherical packing material. When the typical diameter D is taken as the same as that of the sphere, the spherical packing material has the circumference ratio respect to the cross-section is shortest among the packing material shown in FIGS. 12(a) to (d), the rate of growth in the liquid-film is poor. Packing the plurality of such packing materials tends to become most dense packing and, thus, the space velocity becomes the smallest. As a result, the pressure loss in the course of passing the melt through packing 60' becomes the highest.

FIGS. 12(e) through (h) each is a packing material shown in FIGS. 12(a) through (d) each having pore or pores. They have larger circumference ratio respect to the cross-section than that of the sphere having a pore. As a result, the area of contact (interfacial area) with the vacuum atmosphere becomes large, and the metal vapor in the melt can removed in much more suitable manner.

Embodiments of this invention have been described above, but this invention is not restricted thereto. Any other embodiment may be included in the scope of this invention without departing from the configuration and gist of this invention.

For example, cylindrical upper vacuum chamber 8 may have a peephole for observing the internal situations according to the convenience for operation. Alternatively, the device may have various measuring instruments in order to automatically operate the device based on results of the measurements by these measuring instruments.

Lastly, a description with reference to FIG. 11 shall be given concerning the reaction temperatures for reducing various metal oxides by carbon. Whereas in the case where metal oxides are to be vacuum reduced by performing resistive heating in vacuum using a high-melting point metal, such as molybdenum, etc., the reaction will take place at a high temperature of 1800° C. or more due to the high melting points of the metal oxides, when an induction heating pipe or receiving container formed from carbon material or graphite material is used and carbon reduction is performed by induction heating as in the present invention, the reduction reaction will proceed at a temperature of approximately 1000° C. or more even in the case of ZnO, which is the most difficult to reduce among the metal oxides. (Since the point at which the standard free energy line of $2C+O_2 \rightarrow 2CO$ intersects with the standard free energy line related to the generation reaction of each oxide is the reaction equilibrium point, the reaction equilibrium temperature will be at the point at which the vertical line drawn from the reaction equilibrium point intersects the temperature axis. Since the reaction of reduction of a metal oxide by carbon is an endothermic reaction, the reaction will proceed as long as the temperature is higher than the reaction equilibrium temperature.) This has been confirmed by experiments as well. Since the difficult-to-vaporize oxides of Pb and Zn in metal-oxide-containing powders can be removed favorably at a lower reaction temperature than the reaction temperature of vacuum reduction, the energy consumption can be made low. Also, at a temperature of 1600° C. or less, the oxides of Si and Al, which are often used as furnace materials, will not undergo carbon reduction.

The embodiments of the present invention have been described previously, but this invention is not restricted thereto. For example, induction heating coil 10 has been described which surrounds the induction heating pipe, but the induction heating coil exhibits similar functions and effects, if it is provided so as to surround the receiving container or packing placed in the interior of the cylindrical upper vacuum chamber. Consequently, such an embodiment encompasses the scope of this invention.

INDUSTRIAL APPLICABILITY

Due to the having the above arrangement, this invention enables incineration ash, fly ash, and other forms of ash to be favorably removed of metals and rendered harmless, enables recovery of the metals at high purity and high recovery, and enables induction-heat melting treatment of powders to be carried out at low running cost.

What is claimed is:

1. A method of induction-heat melting treatment of metal-oxide-containing powders, comprising:

storing a metal-oxide-containing powder in a closed hopper, supplying said metal-oxide-containing powder that has been stored in said closed hopper at a prescribed flow rate to an induction heating pipe, which is comprised of a heated dielectric material, and heating said metal-oxide-containing powder as it falls through said induction heating pipe to melt while at least a part of the metal oxides are reduced, wherein the melt that has been obtained by melting is heated while being stored in a receiving container which lets the melt overflow, made of dielectric material, to reduce the remaining metal oxides, exposing a liquid-film melt flow that overflows and flows down from said receiving container to a vacuum atmosphere to cause the metals in the melt to vaporize into vapor and/or condemned particles and thereby convey the metals along with an ascending evacuation flow, collecting the metal vapor particles and/or condensed metal particles in said ascending evacuation flow by an electric precipitation means, wherein the melt flow that overflows and flows down from said receiving container is received and stored in a melt storage tank, and removing and recovering the metals that have been collected by said electrostatic precipitation means from said precipitation means, wherein at least one of either said induction heating pipe and said receiving container is formed from carbon material or graphite material.

2. A device for induction-heat melting treatment of metal-oxide-containing powders, comprising:

a closed hopper, which stores a metal-oxide-containing powder, a heat-resistant piping, which is equipped with a means for controlling the flow rate of said metal-oxide containing powder and supplies said metal-oxide-containing powder from said closed hopper to an induction heating pipe, an induction heating pipe, which is comprised of dielectric material and the inner peripheral surface of the upper end part of which contacts the outer peripheral surface of the lower end part of said heat-resistant piping in a manner enabling sliding in the vertical direction, a raising/lowering drive mechanism, which holds the upper end part of said induction heating pipe in a manner enabling raising and lowering, a receiving container, which is made of dielectric material and surrounds the lower part of said induction heating pipe and receives the melt of the powder, melted in said induction heating pipe, while letting the melt overflow, a cylindrical upper vacuum chamber, which encloses the lower part of said heat-resistant piping, said induction heating pipe, a part of said raising/lowering mechanism, and said receiving container, and is connected to an evacuation means, an induction heating coil, which is disposed so as to externally surround the positions of said cylindrical upper vacuum chamber corresponding to said induction heating pipe, an electric precipitation means, which is disposed above said receiving container in said cylindrical upper vacuum chamber so as to externally surround said induction heating pipe and/or is disposed inside an evacuation pipe from said cylindrical upper vacuum chamber and collects the metal vapor particles and/or the condensed metal particles resulting from vaporization from a liquid-film melt that overflows and flows down from said receiving container, a tilting pan, which receives the melt that overflows and flows down from said receiving container and is supported in a manner enabling tilting and return to the horizontal position, a tilting mechanism for said tilting pan, a melt storage tank, which receives and stores the melt from said tilting pan, and a lower vacuum chamber, which encloses said tilting pan and melt storage tank and is connected to the lower end of said cylindrical upper vacuum chamber.

3. A device for induction-heat melting treatment of metal-oxide-containing powders as set forth in claim 2, wherein said lower vacuum chamber comprises:

a partition plate, which divides the interior of said lower vacuum chamber into an upper chamber that encloses said tilting pan and a lower chamber that encloses said melt storage tank, a through hole, which is provided in said partition plate in order to cause the melt to flow down from said tilting pan to said melt storage tank, an opening/closing lid, which opens and closes said through hole, an atmospheric inlet pipe, which is connected to said lower chamber and is equipped with an atmospheric inlet valve, an evacuation pipe, which is connected to said lower chamber, and an opening/closing door, which is provided at the side wall of said lower chamber for moving said melt storage tank in and out of the lower chamber.

4. A device for induction-heat melting treatment of metal-oxide-containing powders as set forth in claim 2, wherein said lower vacuum chamber comprises:

a partition plate, which divides the interior of said lower vacuum chamber into an upper chamber that encloses said tilting pan and a lower chamber that encloses said melt storage tank, a partition wall, which partitions said lower chamber into the two parts of left and right lower chambers, left and right through holes, which are made in said partition plate in order to cause the melt to flow down from said tilting pan to each of the melt storage tanks enclosed respectively in said left and right lower chambers, opening/closing lids, which open and close said left and right through holes, respectively, atmospheric inlet pipes, which are respectively equipped with atmospheric inlet valves and connected respectively to said left and right lower chambers, evacuation pipes, which are connected respectively to said left and right lower chambers, and opening/closing doors, which are provided at the side walls of said left and right lower chambers, respectively, for enabling said melt storage tanks to be moved in and out of the respective lower chambers.

5. A device for induction-heat melting treatment of metal-oxide-containing powders as set forth in any one of the claims 2 through 4, wherein said induction heating pipe and said receiving container are formed from carbon material, graphite material, or high-melting-point metal.

6. A device for induction-heat melting treatment of metal-oxide-containing powders as set forth in any one of the claims 2 through 4, wherein said induction heating pipe and said receiving container are formed from dielectric ceramic material.

7. A device for induction-heat melting treatment of metal-oxide-containing powders as set forth in any one of the claims 2 through 4, wherein a protruding part is provided at the inner bottom surface part of said receiving container that is immediately below said induction heating pipe and said raising/lowering drive mechanism includes a servo motor.

8. A device for induction-heat melting treatment of metal-oxide-containing powders as set forth in any one of the claims 2 through 4, wherein said receiving container is made to have an inverted trapezoidal cross-sectional shape and has grooves formed at intervals along the circumference of the upper end thereof and/or is equipped, at the upper end of the side wall thereof, with a flange part that extends outward with grooves being formed at intervals along the circumference of said flange part.

9. A device for induction-heat melting treatment of metal-oxide-containing powders as set forth in any one of the claims 2 through 4, wherein notched parts are provided at intervals along the circumference of the upper end of the side wall of said receiving container.

10. A device for induction-heat melting treatment of metal-oxide-containing powders, comprising:
a closed hopper, which stores a metal-oxide-containing powder,
a heat-resistant piping, which is equipped with a means for controlling the flow rate of said metal-oxide containing powder and supplies said metal-oxide-containing powder from said closed hopper to an induction heating pipe,
an induction heating pipe, which is comprised of dielectric material and the inner peripheral surface of the upper end part of which contacts the outer peripheral surface of the lower end part of said heat-resistant piping in a manner enabling sliding in the vertical direction,
a raising/lowering drive mechanism, which holds the upper end part of said induction heating pipe in a manner enabling raising and lowering,
a packing, which is made of dielectric material and surrounds the lower part of said induction heating pipe and receives the melt of the powder, melted in said induction heating pipe, while letting the melt overflow,
a cylindrical upper vacuum chamber, which encloses the lower part of said heat-resistant piping, said induction heating pipe, a part of said raising/lowering mechanism, and said packing, and is connected to an evacuation means,
an induction heating coil, which is disposed so as to externally surround the positions of said cylindrical upper vacuum chamber corresponding to said induction heating pipe,
an electric precipitation means, which is disposed above said packing in said cylindrical upper vacuum chamber so as to externally surround said induction heating pipe and/or is disposed inside an evacuation pipe from said cylindrical upper vacuum chamber and collects the metal vapor particles and/or the condensed metal particles resulting from vaporization from a liquid-film melt that overflows and flows down from said packing,
a tilting pan, which receives the melt that overflows and flows down from said packing and is supported in a manner enabling tilting and return to the horizontal position,
a tilting mechanism for said tilting pan,
a melt storage tank, which receives and stores the melt from said tilting pan, and
a lower vacuum chamber, which encloses said tilting pan and said melt storage tank and is connected to the lower end of said cylindrical upper vacuum chamber.

11. A device for induction-heat melting treatment of metal-oxide-containing powders as set forth in claim 10, wherein said lower vacuum chamber comprises:
a partition plate, which divides the interior of said lower vacuum chamber into an upper chamber that encloses said tilting pan and a lower chamber that encloses said melt storage tank,
a through hole, which is provided in said partition plate in order to cause the melt to flow down from said tilting pan to said melt storage tank,
an opening/closing lid, which opens and closes said through hole,
an atmospheric inlet pipe, which is connected to said lower chamber and is equipped with an atmospheric inlet valve,
an evacuation pipe, which is connected to said lower chamber, and
an opening/closing door, which is provided at the side wall of said lower chamber for moving said melt storage tank in and out of the lower chamber.

12. A device for induction-heat melting treatment of metal-oxide-containing powders as set forth in claim 10, wherein said lower vacuum chamber comprises:
a partition plate, which divides the interior of said lower vacuum chamber into an upper chamber that encloses said tilting pan and a lower chamber that encloses said melt storage tank,
a partition wall, which partitions said lower chamber into the two parts of left and right lower chambers,
left and right through holes, which are made in said partition plate in order to cause the melt to flow down from said tilting pan to each of the melt storage tanks enclosed respectively in said left and right lower chambers,
opening/closing lids, which open and close said left and right through holes, respectively,
atmospheric inlet pipes, which are respectively equipped with atmospheric inlet valves and connected respectively to said left and right lower chambers,
evacuation pipes, which are connected respectively to said left and right lower chambers, and
opening/closing doors, which are provided at the side walls of said left and right lower chambers, respectively, for enabling said melt storage tanks to be moved in and out of the respective lower chambers.

13. A device for induction-heat melting treatment of metal-oxide-containing powders as set forth in any one of the claims 10 through 12, wherein said induction heating pipe and said receiving container are formed from carbon material, graphite material, or high-melting-point metal.

14. A device for induction-heat melting treatment of metal-oxide-containing powders as set forth in any one of the claims 10 through 12, wherein said induction heating pipe and said packing are formed from dielectric ceramic material.

15. A device for induction-heat melting treatment of metal-oxide-containing powders as set forth in any one of the claims 10 through 12, wherein said raising/lowering drive mechanism includes a servo motor.

16. A device for induction-heat melting treatment of metal-oxide-containing powders as set forth in any one of the claims 10 through 12, wherein said packing is composed of a circular cap having a protruding part at the center thereof, with a plurality of circular or semicircular pores around the outer circumference thereof and a circular plate having a circular pore at the center thereof, and a downward slope from the outer circumference to the center pore, placed via a gap, and said packing is in contact with a lower inner wall of said cylindrical upper vacuum chamber.

17. A device for induction-heat melting treatment of metal-oxide-containing powders as set forth in any one of the claims 10 through 12, wherein said packing is composed of an uneven packing material in which when the typical diameter is taken as the same as the sphere, the circumference ratio relative to the cross-section of the material is longer than the sphere, and a packing support, and said packing is supported on a lower inner wall of said cylindrical upper vacuum chamber via the packing support.

18. A device for induction-heat melting treatment of metal-oxide-containing powders as set forth in any one of the claims 10 through 12, wherein said packing is composed of an uneven packing material in which when the typical diameter is taken as the same as the sphere, the circumference ratio relative to the cross-section of the material is longer than the sphere and has a through hole, and a packing support, and said packing is supported on a lower inner wall of said cylindrical upper vacuum chamber via the packing support.

* * * * *